US010232865B2

(12) United States Patent
Plegge et al.

(10) Patent No.: US 10,232,865 B2
(45) Date of Patent: Mar. 19, 2019

(54) TRUCK MOUNTED BRAKE SYSTEM FOR ROD-UNDER STYLE BOLSTERS

(71) Applicant: Westinghouse Air Brake Technologies Corporation, Wilmerding, PA (US)

(72) Inventors: Richard Wayne Plegge, Palatine, IL (US); Peter Paul Gregar, Greenville, SC (US); Michael Koziol, Berwyn, IL (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 106 days.

(21) Appl. No.: 15/221,834

(22) Filed: Jul. 28, 2016

(65) Prior Publication Data

US 2017/0029000 A1 Feb. 2, 2017

Related U.S. Application Data

(60) Provisional application No. 62/198,432, filed on Jul. 29, 2015.

(51) Int. Cl.
*B61H 1/00* (2006.01)
*B61H 15/00* (2006.01)
*F16D 65/38* (2006.01)

(52) U.S. Cl.
CPC .......... *B61H 15/0007* (2013.01); *B61H 1/00* (2013.01); *F16D 65/38* (2013.01)

(58) Field of Classification Search
CPC ........ B61H 13/24; B61H 13/36; B61H 15/00; B61H 1/00; B61H 13/38; B61H 13/20;
(Continued)

(56) References Cited

U.S. PATENT DOCUMENTS 3,298,475 A * 1/1967 Mersereau ............. B61H 13/24
188/196 B
3,324,977 A * 6/1967 Billeter .................. B61H 13/24
188/197
(Continued)

FOREIGN PATENT DOCUMENTS

EP 0217589 A2 4/1987
WO WO-2010141138 A1 * 12/2010 ......... B61H 15/0007
(Continued)

*Primary Examiner* — Thomas J Williams
*Assistant Examiner* — Mahbubur Rashid
(74) *Attorney, Agent, or Firm* — The Webb Law Firm

(57) ABSTRACT

A railcar brake system includes a first brake beam and a second brake beam configured to be mounted on opposite sides of a bolster of a railcar truck; a brake cylinder connected to the first brake beam; a first lever and a second lever pivotally connected to the first brake beam at separate points, the first lever and the second lever also being connected to opposing ends of the brake cylinder to connect the brake cylinder to the first brake beam; a slack adjuster connected to the second brake beam; a first push rod connecting the first lever to the second brake beam and the slack adjuster; and a second push rod connecting the second lever to the second brake beam and the slack adjuster. Actuation of the brake cylinder causes movement of the brake beams via the first and second levers and the first and second push rods.

20 Claims, 10 Drawing Sheets

(58) Field of Classification Search
CPC .............. B61H 13/34; B61H 15/0057; B61H 15/0014; B60T 11/04; B60T 7/108; F16D 65/38
See application file for complete search history.

(56) References Cited

U.S. PATENT DOCUMENTS

| | | | | |
|---|---|---|---|---|
| 3,326,335 A * | 6/1967 | Billeter | ............. | B61H 15/0057 188/196 D |
| 3,406,794 A * | 10/1968 | Mersereau | ............. | B61H 13/24 188/195 |
| 3,435,923 A * | 4/1969 | Billeter | ................. | B61H 13/24 188/197 |
| 3,533,492 A * | 10/1970 | Campbell | ............. | B61H 13/24 188/197 |
| 3,780,837 A | 12/1973 | Haydu | | |
| 4,060,152 A | 11/1977 | Bogenschutz et al. | | |
| 4,613,016 A | 9/1986 | Hart et al. | | |
| 4,653,812 A * | 3/1987 | Engle | ................... | B60T 8/1837 303/22.2 |
| 4,766,980 A * | 8/1988 | Engle | ................... | B60T 17/081 188/206 R |
| 4,771,868 A * | 9/1988 | Haydu | ................... | B61H 13/02 188/52 |
| 4,775,035 A | 10/1988 | Brodeur et al. | | |
| 5,069,312 A * | 12/1991 | Kanjo | .................. | B61H 13/02 188/33 |
| 5,259,485 A * | 11/1993 | Jackson | ............ | B61H 15/0014 188/198 |
| 5,400,874 A * | 3/1995 | Gayfer | .................. | B61H 13/24 188/197 |
| 5,507,368 A | 4/1996 | Barefoot | | |
| 5,947,236 A * | 9/1999 | Sauter | ................... | B61H 13/24 188/228.1 |
| 6,155,387 A * | 12/2000 | Sauter | .................. | B61H 13/24 188/219.1 |
| 6,332,515 B1 * | 12/2001 | Sauter | .................. | B61H 13/24 188/153 R |
| 6,347,447 B1 | 2/2002 | Sauter | | |
| 6,971,488 B1 * | 12/2005 | Ring | ..................... | B61H 13/24 188/107 |
| 7,472,755 B2 | 1/2009 | Riggs | | |
| 9,725,102 B2 * | 8/2017 | Sunde | ............... | B61H 15/0028 |
| 9,855,960 B2 * | 1/2018 | Sunde | ..................... | B61H 1/00 |
| 2004/0003971 A1 * | 1/2004 | Sommerfeld | ............. | B60T 1/04 188/107 |
| 2007/0209886 A1 | 9/2007 | Tuten | | |
| 2011/0108376 A1 * | 5/2011 | Call | ................... | B61H 15/0007 188/151 R |
| 2015/0014102 A1 | 1/2015 | Koziol | | |
| 2015/0027825 A1 * | 1/2015 | Smileski | ................ | B61H 13/24 188/198 |
| 2015/0321681 A1 * | 11/2015 | Sunde | ................... | B61H 13/32 188/52 |

FOREIGN PATENT DOCUMENTS

| | | |
|---|---|---|
| WO | 2013098350 A2 | 7/2013 |
| WO | 2014200974 A1 | 12/2014 |

* cited by examiner

TRUCK MOUNTED BRAKE SYSTEM FOR ROD-UNDER STYLE BOLSTERS

CROSS REFERENCE TO RELATED APPLICATIONS

The present application claims priority from U.S. Provisional Patent Application No. 62/198,432, filed on Jul. 29, 2015, which is incorporated herein by reference in its entirety.

BACKGROUND OF THE INVENTION

Field of the Invention

The present invention relates generally to a truck mounted brake system for railcars and, in particular, to a brake system having an assembly that is mounted on the railcar on either side of the bolster and extends under the bolster.

Description of Related Art

Typical truck mounted brake systems include a pair of brake beams mounted to the railcar truck on either side of the bolster. A brake cylinder is disposed on one of the brake beams, or mounted to the bolster and is connected to both brake beams via a linkage arrangement to actuate the brake beams to move such that the brake head/shoe arrangements at each end of the brake beams moves into engagement with the wheels. The linkage arrangement typically passes through the bolster, which requires a large cast window be formed in the bolster to pass the linkage arrangement through the bolster. For bolsters without large cast windows, the linkage arrangement may pass under the bolster.

A slack adjuster is also provided in the system to prevent over-extension of the piston from the brake cylinder as the brake shoes wear during use. The slack adjuster, when disposed on the same brake beam as the brake cylinder, causes a weight imbalance between the brake beams. The uneven weight distribution between the brake beams can lead to uneven wear of the brake shoes.

SUMMARY OF THE INVENTION

Generally, provided is a truck mounted system that provides for an even weight distribution of the system components and also provides for an assembly that is able to pass under the ends of the bolster of the railcar truck.

According to one embodiment or aspect of the present disclosure, a brake system for application to a two-axle, four-wheel railcar truck is provided. Two parallel brake beams are connected transversely between the railcar truck side frames. The first and second brake beams each include a pair of pivotally mounted bell crank-type levers, spaced equally about the center line of each brake beam. A brake cylinder body, connected to one first lever arm, and a piston rod, connected to the opposite first lever arm, is oriented parallel to the first brake beam. A pair of push rods is connected to the second arm of each first lever. The push rods extend under the truck bolster ends, toward the second brake beam, connected to the second arm of the second brake beam bell crank levers. A slack adjuster, oriented parallel to the second brake beam, is connected to the first arm of the second brake beam bell crank levers. A push-pull cable assembly, connected to the brake cylinder on the first brake beam, is connected to the slack adjuster on the second brake beam to facilitate slack adjuster activation. The invention provides for a generally symmetric mass loading of the brake system with respect to the lateral centerline of the railcar truck. The two bell crank levers on both the first and second brake beams allow for the cylinder and slack adjuster device to be independent and separated about the truck centerline.

According to another embodiment or aspect of the present disclosure, a railcar brake system is provided. The assembly includes a first brake beam and a second brake beam configured to be mounted on opposite sides of a bolster of a railcar truck, each of the first brake beam and the second brake beam being configured to have brake heads disposed on opposing ends thereof; a brake cylinder connected to the first brake beam; a first lever and a second lever pivotally connected to the first brake beam at separate points on the first brake beam, the first lever and the second lever also being connected to opposing ends of the brake cylinder to connect the brake cylinder to the first brake beam; a slack adjuster connected to the second brake beam; a third lever and a fourth lever pivotally connected to the second brake beam at separate points on the second brake beam; a first push rod operatively connecting the first lever to the third lever; and a second push rod operatively connecting the second lever to the fourth lever. Actuation of the brake cylinder causes movement of the brake beams via the first, second, third and fourth levers, and the first and second push rods.

According to another embodiment or aspect of the present disclosure, a slack adjustment mechanism for a railcar brake system is provided. The slack adjustment mechanism includes a brake cylinder, the brake cylinder including a cylinder body and a cylinder piston; a slack adjuster positioned remotely from the brake cylinder in the brake assembly, the slack adjuster having an adjustable length and including a trigger arm configured to be actuated to cause the slack adjuster to increase in length and a cable bracket; and a cable assembly operatively connecting the brake cylinder to the slack adjuster. The cable assembly includes an outer conduit having a first end connected to the cylinder body and a second end connected to the cable bracket of the slack adjuster; and an inner cable at least partially disposed in the outer conduit, the inner cable having a first end connected to the cylinder piston and a second end connected to the trigger arm of the slack adjuster. The inner cable is connected to the cylinder piston and the trigger arm of the slack adjuster such that inner cable pulls the trigger arm of the slack adjuster, causing the slack adjuster to increase in length when the brake cylinder is actuated such that the cylinder piston extends from the cylinder body by a travel distance.

In accordance with one preferred and non-limiting embodiment or aspect of the present disclosure, a railcar brake system is provided. The system includes a first brake beam and a second brake beam configured to be mounted on opposite sides of a bolster of a railcar truck, each of the first brake beam and the second brake beam being configured to have brake heads disposed on opposing ends thereof; a brake cylinder connected to the first brake beam; a first lever and a second lever pivotally connected to the first brake beam at separate points on the first brake beam, the first lever and the second lever also being connected to opposing ends of the brake cylinder to connect the brake cylinder to the first brake beam; a slack adjuster connected to the second brake beam; a first push rod operatively connecting the first lever to the second brake beam and the slack adjuster; and a second push rod operatively connecting the second lever to the second brake beam and the slack adjuster. Actuation of the brake cylinder causes movement of the brake beams via the first and second levers and the first and second push rods.

According to the preferred and non-limiting embodiment or aspect, the system further includes a third lever and a fourth lever pivotally connected to the second brake beam at separate points on the second brake beam, the third lever and the fourth lever also being connected to opposing ends of the slack adjuster to connect the slack adjuster to the second brake beam. The first push rod operatively connects the third lever to the first lever and the second push rod operatively connects the fourth lever to the second lever. Actuation of the brake cylinder causes movement of the brake beams via the first, second, third, and fourth levers and the first and second push rods. The second brake beam and the slack adjuster are operatively connected to the first push rod and the second push rod by the third lever and the fourth lever, respectively.

According to the preferred and non-limiting embodiment or aspect, the first brake beam includes at least two stops disposed thereon adjacent to each of the first lever and the second lever. The at least two stops are configured to engage the first lever and the second lever to limit movement of the first lever and the second lever and to align the brake cylinder and the first and second levers with respect to the truck.

According to the preferred and non-limiting embodiment or aspect, the system further includes brake heads disposed on each end of the first brake beam and the second brake beam, each of the brake heads defining a brake face having a center. The first lever and the second lever define a common mid-plane extending through the levers, and wherein the mid-plane of the levers is substantially coincident with the center of each of the brake faces of the brake heads.

According to the preferred and non-limiting embodiment or aspect, the slack adjuster has an adjustable length. The slack adjuster includes a trigger arm configured to be actuated to trigger the slack adjuster to undergo a length adjustment. The brake system further includes a remote trigger mechanism connected to the trigger arm. The remote trigger mechanism is configured to actuate the trigger arm when the brake cylinder is actuated.

According to the preferred and non-limiting embodiment or aspect, the remote trigger mechanism includes a cable assembly operatively connecting the brake cylinder to the slack adjuster. The cable assembly includes an outer conduit having a first end connected to the brake cylinder and a second end connected to the slack adjuster; and an inner cable at least partially disposed in the outer conduit, the inner cable having a first end connected to the brake cylinder and a second end connected to the trigger arm of the slack adjuster. The inner cable is connected to the brake cylinder and the trigger arm of the slack adjuster such that the inner cable pulls the trigger arm of the slack adjuster and triggers the slack adjuster when the brake cylinder is actuated.

According to the preferred and non-limiting embodiment or aspect, the trigger arm is pivotally connected to a slack adjuster jaw of the slack adjuster. The system further includes a spring over travel assembly connecting the second end of the inner cable of the cable assembly to the trigger arm of the slack adjuster. The spring over travel assembly includes: a slack adjuster cable rod end defining the second end of the inner cable, the slack adjuster cable rod end extending through an aperture defined in the trigger arm; a spherical washer disposed on the slack adjuster cable rod end in a position facing the aperture of the trigger arm; a washer and a fastener disposed at an end of the slack adjuster cable rod end; and a spring disposed on the slack adjuster cable rod end, the spring being held on the slack adjuster cable rod end between the spherical washer and the washer and fastener. The spring over travel assembly is configured to prevent damage to the trigger arm caused by the trigger arm contacting the slack adjuster jaw.

According to the preferred and non-limiting embodiment or aspect, the brake cylinder includes a cylinder body and a cylinder piston. The first end of the outer conduit of the cable assembly is connected to the cylinder body and the first end of the inner cable of the cable assembly is connected to the cylinder piston. The brake cylinder is actuated such that the cylinder piston extends from the cylinder body. The cylinder piston causes the inner cable to pull the trigger arm of the slack adjuster to trigger the slack adjuster when the cylinder piston extends from the brake cylinder by a travel distance. The first end of the inner cable of the cable assembly is defined by a cylinder cable rod end. The cylinder cable rod end is inserted through a piston travel arm extending from a cylinder piston jaw of the cylinder piston to slidably connect the first end of the inner cable to the cylinder piston. At least one adjustment element is disposed on the cylinder cable rod end. The at least one adjustment element is configured to be moved along the cylinder cable rod end to set the travel distance of the cylinder piston.

According to another preferred and non-limiting embodiment or aspect of the present disclosure, a slack adjustment mechanism for a railcar brake system is provided. The slack adjustment mechanism includes a brake cylinder, the brake cylinder including a cylinder body and a cylinder piston; a slack adjuster positioned remotely from the brake cylinder in the brake assembly, the slack adjuster having an adjustable length and including a trigger arm configured to be actuated to trigger the slack adjuster to undergo a length adjustment; and a remote trigger mechanism connected to the trigger arm, wherein the remote trigger mechanism is configured to actuate the trigger arm when the brake cylinder is actuated.

According to the preferred and non-limiting embodiment or aspect, the remote trigger mechanism includes a cable assembly operatively connecting the brake cylinder to the slack adjuster. The cable assembly includes an outer conduit having a first end connected to the cylinder body and a second end connected to the slack adjuster; and an inner cable at least partially disposed in the outer conduit, the inner cable having a first end connected to the cylinder piston and a second end connected to the trigger arm of the slack adjuster. The inner cable is connected to the cylinder piston and the trigger arm of the slack adjuster such that the inner cable pulls the trigger arm of the slack adjuster and triggers the slack adjuster when the brake cylinder is actuated such that the cylinder piston extends from the cylinder body by a travel distance.

According to the preferred and non-limiting embodiment or aspect, the trigger arm is pivotally connected to a slack adjuster jaw of the slack adjuster. The system further includes a spring over travel assembly connecting the second end of the inner cable of the cable assembly to the trigger arm of the slack adjuster. The spring over travel assembly includes a slack adjuster cable rod end defining the second end of the inner cable, the slack adjuster cable rod end extending through an aperture defined in the trigger arm; a spherical washer disposed on the slack adjuster cable rod end in a position facing the aperture of the trigger arm; a washer and a fastener disposed at an end of the slack adjuster cable rod end; and a spring disposed on the slack adjuster cable rod end, the spring being held on the slack adjuster cable rod end between the spherical washer and the washer and fastener. The spring over travel assembly is configured to prevent damage to the trigger arm caused by the trigger arm contacting the slack adjuster jaw.

According to the preferred and non-limiting embodiment or aspect, the mechanism further includes at least one adjustment element disposed on the cable assembly, the at least one adjustment element being configured to be moved along the cable assembly to set the travel distance of the cylinder piston.

According to another preferred and non-limiting embodiment or aspect of the present disclosure, a railcar brake system is provided. The brake system includes a first brake beam and a second brake beam configured to be mounted on opposite sides of a bolster of a railcar truck; a brake cylinder connected to the first brake beam; at least one lever pivotally connected to the first brake beam, the at least one lever also being connected to an end of the brake cylinder to connect the brake cylinder to the first brake beam; a slack adjuster operatively connected to the brake cylinder; a pair of levers pivotally connected to the second brake beam at separate points on the second brake beam; a first push rod operatively connecting the first lever to one of the pair of levers; a second push rod operatively connecting the first brake beam to the other of the pair of levers; and brake heads disposed on each end of the first brake beam and the second brake beam, each of the brake heads defining a brake face having a center. Actuation of the brake cylinder causes movement of the brake beams via the at least one lever pivotally connected to the first brake beam, the pair of levers pivotally connected to the second brake beam, and the first and second push rods. The at least one lever pivotally connected to the first brake beam and the pair of levers pivotally connected to the second brake beam define a common mid-plane extending through all of the levers. The mid-plane of the levers is substantially coincident with the center of each of the brake faces of the brake heads.

According to the non-limiting embodiment or aspect, the at least one lever pivotally connected to the first brake beam includes a first lever and a second lever pivotally connected to the first brake beam at separate points on the first brake beam, the first lever and the second lever also being connected to opposing ends of the brake cylinder to connect the brake cylinder to the first brake beam.

According to the non-limiting embodiment or aspect, the slack adjuster has an adjustable length. The slack adjuster includes a trigger arm configured to be actuated to cause the slack adjuster to increase in length and a cable bracket.

According to another preferred and non-limiting embodiment or aspect of the present disclosure, a railcar brake system is provided. The brake system includes a first brake beam and a second brake beam configured to be mounted on opposite sides of a bolster of a railcar truck, each of the first brake beam and the second brake beam being configured to have brake heads disposed on opposing ends thereof; a brake cylinder connected to the first brake beam; at least one lever pivotally connected to the first brake beam, the at least one lever also being connected to an end of the brake cylinder to connect the brake cylinder to the first brake beam; a slack adjuster connected to the second brake beam; a pair of levers pivotally connected to the second brake beam at separate points on the second brake beam, the pair of levers also being connected to opposing ends of the slack adjuster to connect the slack adjuster to the second brake beam; a first push rod operatively connecting the first lever to one of the pair of levers; and a second push rod operatively connecting the first brake beam to the other of the pair of levers. Actuation of the brake cylinder causes movement of the brake beams via the at least one lever pivotally connected to the first brake beam, the pair of levers pivotally connected to the second brake beam, and the first and second push rods.

According to the preferred and non-limiting embodiment or aspect, wherein and the first brake beam includes at least one stop disposed thereon adjacent to the lever pivotally connected to the first brake beam. The at least one stop is configured to engage the lever to limit movement of the lever and to align the brake cylinder and the lever with respect to the truck.

According to the preferred and non-limiting embodiment or aspect, the slack adjuster has an adjustable length. The slack adjuster includes a trigger arm configured to be actuated to trigger the slack adjuster to undergo a length adjustment. The brake system further includes a remote trigger mechanism connected to the trigger arm. The remote trigger mechanism is configured to actuate the trigger arm when the brake cylinder is actuated.

Further preferred and non-limiting embodiment or aspects will now be described in the following number clauses.

Clause 1: A railcar brake system, comprising: a first brake beam and a second brake beam configured to be mounted on opposite sides of a bolster of a railcar truck, each of the first brake beam and the second brake beam being configured to have brake heads disposed on opposing ends thereof; a brake cylinder connected to the first brake beam; a first lever and a second lever pivotally connected to the first brake beam at separate points on the first brake beam, the first lever and the second lever also being connected to opposing ends of the brake cylinder to connect the brake cylinder to the first brake beam; a slack adjuster connected to the second brake beam; a first push rod operatively connecting the first lever to the second brake beam and the slack adjuster; and a second push rod operatively connecting the second lever to the second brake beam and the slack adjuster, wherein actuation of the brake cylinder causes movement of the brake beams via the first and second levers and the first and second push rods.

Clause 2: The railcar brake system according to clause 1, further comprising: a third lever and a fourth lever pivotally connected to the second brake beam at separate points on the second brake beam, the third lever and the fourth lever also being connected to opposing ends of the slack adjuster to connect the slack adjuster to the second brake beam, wherein the first push rod operatively connects the third lever to the first lever and the second push rod operatively connects the fourth lever to the second lever, and wherein actuation of the brake cylinder causes movement of the brake beams via the first, second, third, and fourth levers and the first and second push rods.

Clause 3: The railcar brake system according to clause 2, wherein the second brake beam and the slack adjuster are operatively connected to the first push rod and the second push rod by the third lever and the fourth lever, respectively.

Clause 4: The railcar brake system according to any one of clauses 1-3, wherein the first brake beam includes at least two stops disposed thereon adjacent to each of the first lever and the second lever, and wherein the at least two stops are configured to engage the first lever and the second lever to limit movement of the first lever and the second lever and to align the brake cylinder and the first and second levers with respect to the truck.

Clause 5: The railcar brake system according to any one of clauses 1-4, further comprising brake heads disposed on each end of the first brake beam and the second brake beam, each of the brake heads defining a brake face having a center, wherein the first lever and the second lever define a common mid-plane extending through the levers, and wherein the mid-plane of the levers is substantially coincident with the center of each of the brake faces of the brake heads.

Clause 6: The railcar brake system according to any one of clauses 1-5, wherein the slack adjuster has an adjustable length, and wherein the slack adjuster comprises a trigger arm configured to be actuated to trigger the slack adjuster to undergo a length adjustment.

Clause 7: The railcar brake system according to clause 6, further comprising a remote trigger mechanism connected to the trigger arm, wherein the remote trigger mechanism is configured to actuate the trigger arm when the brake cylinder is actuated.

Clause 8: The railcar brake system according to clause 7, wherein the remote trigger mechanism comprises a cable assembly operatively connecting the brake cylinder to the slack adjuster, the cable assembly comprising: an outer conduit having a first end connected to the brake cylinder and a second end connected to the slack adjuster; and an inner cable at least partially disposed in the outer conduit, the inner cable having a first end connected to the brake cylinder and a second end connected to the trigger arm of the slack adjuster, wherein the inner cable is connected to the brake cylinder and the trigger arm of the slack adjuster such that the inner cable pulls the trigger arm of the slack adjuster and triggers the slack adjuster when the brake cylinder is actuated.

Clause 9: The railcar brake system according to clause 8, wherein the trigger arm is pivotally connected to a slack adjuster jaw of the slack adjuster, and wherein the system further comprises a spring over travel assembly connecting the second end of the inner cable of the cable assembly to the trigger arm of the slack adjuster, the spring over travel assembly comprising: a slack adjuster cable rod end defining the second end of the inner cable, the slack adjuster cable rod end extending through an aperture defined in the trigger arm; a spherical washer disposed on the slack adjuster cable rod end in a position facing the aperture of the trigger arm; a washer and a fastener disposed at an end of the slack adjuster cable rod end; and a spring disposed on the slack adjuster cable rod end, the spring being held on the slack adjuster cable rod end between the spherical washer and the washer and fastener, wherein the spring over travel assembly is configured to prevent damage to the trigger arm caused by the trigger arm contacting the slack adjuster jaw.

Clause 10: The railcar brake system according clause 8 or 9, wherein the brake cylinder comprises a cylinder body and a cylinder piston, wherein the first end of the outer conduit of the cable assembly is connected to the cylinder body and the first end of the inner cable of the cable assembly is connected to the cylinder piston, wherein the brake cylinder is actuated such that the cylinder piston extends from the cylinder body, and wherein the cylinder piston causes the inner cable to pull the trigger arm of the slack adjuster to trigger the slack adjuster when the cylinder piston extends from the brake cylinder by a travel distance.

Clause 11: The railcar brake system according to clause 10, wherein the first end of the inner cable of the cable assembly is defined by a cylinder cable rod end, wherein the cylinder cable rod end is inserted through a piston travel arm extending from a cylinder piston jaw of the cylinder piston to slidably connect the first end of the inner cable to the cylinder piston, wherein at least one adjustment element is disposed on the cylinder cable rod end, and wherein the at least one adjustment element is configured to be moved along the cylinder cable rod end to set the travel distance of the cylinder piston.

Clause 12: The railcar brake system according to any one of clauses 8-11, wherein the inner cable member is movable within the outer conduit.

Clause 13: A slack adjustment mechanism for a railcar brake system, comprising: a brake cylinder, the brake cylinder comprising a cylinder body and a cylinder piston; a slack adjuster positioned remotely from the brake cylinder in the brake assembly, the slack adjuster having an adjustable length and comprising a trigger arm configured to be actuated to cause the slack adjuster to increase in length, and a cable bracket; and a cable assembly operatively connecting the brake cylinder to the slack adjuster, the cable assembly comprising: an outer conduit having a first end connected to the cylinder body and a second end connected to the cable bracket of the slack adjuster; and an inner cable at least partially disposed in the outer conduit, the inner cable having a first end connected to the cylinder piston and a second end connected to the trigger arm of the slack adjuster, wherein the inner cable is connected to the cylinder piston and the trigger arm of the slack adjuster such that the inner cable pulls the trigger arm of the slack adjuster and triggers the slack adjuster undergo a length adjustment when the brake cylinder is actuated such that the cylinder piston extends from the cylinder body by a travel distance.

Clause 14: The slack adjustment mechanism according to clause 13, wherein the trigger arm is pivotally connected to a slack adjuster jaw of the slack adjuster, and wherein the system further comprises a spring over travel assembly connecting the second end of the inner cable of the cable assembly to the trigger arm of the slack adjuster, the spring over travel assembly comprising: a slack adjuster cable rod end defining the second end of the inner cable, the slack adjuster cable rod end extending through an aperture defined in the trigger arm; a spherical washer disposed on the slack adjuster cable rod end in a position facing the aperture of the trigger arm; a washer and a fastener disposed at an end of the slack adjuster cable rod end; and a spring disposed on the slack adjuster cable rod end, the spring being held on the slack adjuster cable rod end between the spherical washer and the washer and fastener, wherein the spring over travel assembly is configured to prevent damage to the trigger arm caused by the trigger arm contacting the slack adjuster jaw.

Clause 15: The slack adjustment mechanism according to clause 13 or 14, wherein the first end of the inner cable of the cable assembly is defined by a cylinder cable rod end, wherein the cylinder cable rod end is inserted through a piston travel arm extending from a cylinder piston jaw of the cylinder piston to slidably connect the first end of the inner cable to the cylinder piston, wherein at least one adjustment element is disposed on the cylinder cable rod end, and wherein the at least one adjustment element is configured to be moved along the cylinder cable rod end to set the travel distance of the cylinder piston.

Clause 16: The slack adjustment mechanism according to any one of clauses 13-15, wherein the inner cable member is movable within the outer conduit.

Clause 17: A railcar brake system, comprising: a first brake beam and a second brake beam configured to be mounted on opposite sides of a bolster of a railcar truck; a brake cylinder connected to the first brake beam; a first lever and a second lever pivotally connected to the first brake beam at separate points on the first brake beam, the first lever and the second lever also being connected to opposing ends of the brake cylinder to connect the brake cylinder to the first brake beam; a slack adjuster operatively connected to the brake cylinder; a third lever and a fourth lever pivotally connected to the second brake beam at separate points on the second brake beam; a first push rod operatively connecting the first lever to the third lever; a second push rod operatively connecting the second lever to the fourth lever; and brake heads disposed on each end of the first brake beam and the second brake beam, each of the brake heads defining a brake face having a center, wherein actuation of the brake cylinder causes movement of the brake beams via the first, second, third, and fourth levers and the first and second push rods, and wherein the first lever, second lever, third lever, and fourth lever define a common mid-plane extending through all of the levers, and wherein the mid-plane of the levers is substantially coincident with the center of each of the brake faces of the brake heads.

Clause 18: The railcar brake system according to clause 17, wherein the first lever and the second lever each have at least one protrusion formed thereon and the first brake beam includes at least two wall portions extending from the first brake beam adjacent to each of the first lever and the second lever, respectively, and wherein the protrusions on the first lever and the second lever and the respective wall portions extending from the brake beam are configured to act as guides for centering the brake cylinder and first and second levers with respect to the truck.

Clause 19: The railcar brake system according to clause 17 or 18, wherein the third lever and the fourth lever are connected to opposing ends of the slack adjuster to connect the slack adjuster to the second brake beam.

Clause 20: The railcar brake system according to clause 19, wherein the slack adjuster has an adjustable length, and wherein the slack adjuster comprises a trigger arm configured to be actuated to trigger the slack adjuster to undergo a length adjustment.

Clause 21: The railcar brake system according to clause 20, further comprising a cable assembly operatively connecting the brake cylinder to the slack adjuster, the cable assembly comprising: an outer conduit having a first end connected to the brake cylinder and a second end connected to the cable bracket of the slack adjuster; and an inner cable at least partially disposed in the outer conduit, the inner cable having a first end connected to the brake cylinder and a second end connected to the trigger arm of the slack adjuster, wherein the inner cable is connected to the brake cylinder and the trigger arm of the slack adjuster such that the inner cable pulls the trigger arm of the slack adjuster and triggers the slack adjuster when the brake cylinder is actuated.

Clause 22: A method of installing a railcar brake system on a railcar truck, comprising: providing the rail car brake system, the rail car brake system comprising: a first brake beam and a second brake beam configured, each of the first brake beam and the second brake beam being configured to have brake heads disposed on opposing ends thereof; a brake cylinder; a first lever and a second lever, the first lever and the second lever each having have at least one protrusion formed thereon; a slack adjuster configured to be operatively connected to the brake cylinder; and a first push rod and a second push rod; mounting the first brake beam and the second brake beam on opposite sides of a bolster of the railcar truck; pivotally connecting the first lever and the second lever at separate points on the first brake beam; connecting the first lever and the second lever to opposing ends of the brake cylinder to connect the brake cylinder to the first brake beam; operatively connecting the first lever to the second brake beam via the first push rod; and operatively connecting the second lever to the second brake beam via the second push rod, wherein actuation of the brake cylinder causes movement of the brake beams via the first and second levers and the first and second push rods, wherein the first brake beam includes at least two wall portions extending from the first brake beam adjacent to each of the first lever and the second lever, respectively, and wherein the method further comprises adjusting the brake cylinder until the protrusions on the first lever and the second lever contact or have minimal clearance with the respective wall portions extending from the first brake beam to center the brake cylinder and the first and second levers with respect to the railcar truck.

Clause 23: The method according to clause 22, wherein the brake system further comprises a third lever and a fourth lever, and wherein the method further comprises: pivotally connecting the third lever and the fourth lever to the second brake beam at separate points on the second brake beam; and connecting the third lever and the fourth lever to opposing ends of the slack adjuster to connect the slack adjuster to the second brake beam, wherein the first push rod operatively connects the third lever to the first lever and the second push rod operatively connects the fourth lever to the second lever, and wherein actuation of the brake cylinder causes movement of the brake beams via the first, second, third, and fourth levers and the first and second push rods.

Clause 24: The method according to clause 23, wherein the second brake beam and the slack adjuster are operatively connected to the first push rod and the second push rod by the third lever and the fourth lever, respectively.

Clause 25: A slack adjustment mechanism for a railcar brake system, comprising: a brake cylinder, the brake cylinder comprising a cylinder body and a cylinder piston; a slack adjuster positioned remotely from the brake cylinder in the brake assembly, the slack adjuster having an adjustable length and comprising a trigger arm configured to be actuated to trigger the slack adjuster to undergo a length adjustment; and a remote trigger mechanism connected to the trigger arm, wherein the remote trigger mechanism is configured to actuate the trigger arm when the brake cylinder is actuated.

Clause 26: The slack adjustment mechanism according to clause 25, wherein the remote trigger mechanism comprises a cable assembly operatively connecting the brake cylinder to the slack adjuster, the cable assembly comprising: an outer conduit having a first end connected to the cylinder body and a second end connected to the slack adjuster; and an inner cable at least partially disposed in the outer conduit, the inner cable having a first end connected to the cylinder piston and a second end connected to the trigger arm of the slack adjuster, wherein the inner cable is connected to the cylinder piston and the trigger arm of the slack adjuster such that the inner cable pulls the trigger arm of the slack adjuster and triggers the slack adjuster when the brake cylinder is actuated such that the cylinder piston extends from the cylinder body by a travel distance.

Clause 27: The slack adjustment mechanism according to clause 26, wherein the trigger arm is pivotally connected to a slack adjuster jaw of the slack adjuster, and wherein the system further comprises a spring over travel assembly connecting the second end of the inner cable of the cable assembly to the trigger arm of the slack adjuster, the spring over travel assembly comprising: a slack adjuster cable rod end defining the second end of the inner cable, the slack adjuster cable rod end extending through an aperture defined in the trigger arm; a spherical washer disposed on the slack adjuster cable rod end in a position facing the aperture of the trigger arm; a washer and a fastener disposed at an end of the slack adjuster cable rod end; and a spring disposed on the slack adjuster cable rod end, the spring being held on the slack adjuster cable rod end between the spherical washer and the washer and fastener, wherein the spring over travel assembly is configured to prevent damage to the trigger arm caused by the trigger arm contacting the slack adjuster jaw.

Clause 28: The slack adjustment mechanism according to clause 26 or 27, further comprising at least one adjustment element disposed on the cable assembly, the at least one adjustment element being configured to be moved along the cable assembly to set the travel distance of the cylinder piston.

Clause 29: A railcar brake system, comprising: a first brake beam and a second brake beam configured to be mounted on opposite sides of a bolster of a railcar truck; a brake cylinder connected to the first brake beam; at least one lever pivotally connected to the first brake beam, the at least one lever also being connected to an end of the brake cylinder to connect the brake cylinder to the first brake beam; a slack adjuster operatively connected to the brake cylinder; a pair of levers pivotally connected to the second brake beam at separate points on the second brake beam; a first push rod operatively connecting the first lever to one of the pair of levers; a second push rod operatively connecting the first brake beam to the other of the pair of levers; and brake heads disposed on each end of the first brake beam and the second brake beam, each of the brake heads defining a brake face having a center, wherein actuation of the brake cylinder causes movement of the brake beams via the at least one lever pivotally connected to the first brake beam, the pair of levers pivotally connected to the second brake beam, and the first and second push rods, and wherein the at least one lever pivotally connected to the first brake beam and the pair of levers pivotally connected to the second brake beam define a common mid-plane extending through all of the levers, and wherein the mid-plane of the levers is substantially coincident with the center of each of the brake faces of the brake heads.

Clause 30: The railcar brake system according to clause 29, wherein the at least one lever pivotally connected to the first brake beam comprises a first lever and a second lever pivotally connected to the first brake beam at separate points on the first brake beam, the first lever and the second lever also being connected to opposing ends of the brake cylinder to connect the brake cylinder to the first brake beam.

Clause 31: A railcar brake system, comprising: a first brake beam and a second brake beam configured to be mounted on opposite sides of a bolster of a railcar truck, each of the first brake beam and the second brake beam being configured to have brake heads disposed on opposing ends thereof; a brake cylinder connected to the first brake beam; at least one lever pivotally connected to the first brake beam, the at least one lever also being connected to an end of the brake cylinder to connect the brake cylinder to the first brake beam; a slack adjuster connected to the second brake beam; a pair of levers pivotally connected to the second brake beam at separate points on the second brake beam, the pair of levers also being connected to opposing ends of the slack adjuster to connect the slack adjuster to the second brake beam; a first push rod operatively connecting the first lever to one of the pair of levers; and a second push rod operatively connecting the first brake beam to the other of the pair of levers, wherein actuation of the brake cylinder causes movement of the brake beams via the at least one lever pivotally connected to the first brake beam, the pair of levers pivotally connected to the second brake beam, and the first and second push rods.

Clause 32: The railcar brake system according to clause 31, wherein and the first brake beam includes at least one stop disposed thereon adjacent to the lever pivotally connected to the first brake beam, and wherein the at least one stop is configured to engage the lever to limit movement of the lever and to align the brake cylinder and the lever with respect to the truck.

Clause 33: The railcar brake system according to clause 31 or 32, wherein the slack adjuster has an adjustable length, and wherein the slack adjuster comprises a trigger arm configured to be actuated to trigger the slack adjuster to undergo a length adjustment.

Clause 34: The railcar brake system according to clause 33, further comprising a remote trigger mechanism connected to the trigger arm, wherein the remote trigger mechanism is configured to actuate the trigger arm when the brake cylinder is actuated.

These and other features and characteristics of the present invention, as well as the methods of operation and functions of the related elements of structures, and the combination of parts and economies of manufacture will become more apparent upon consideration of the following description and with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1:
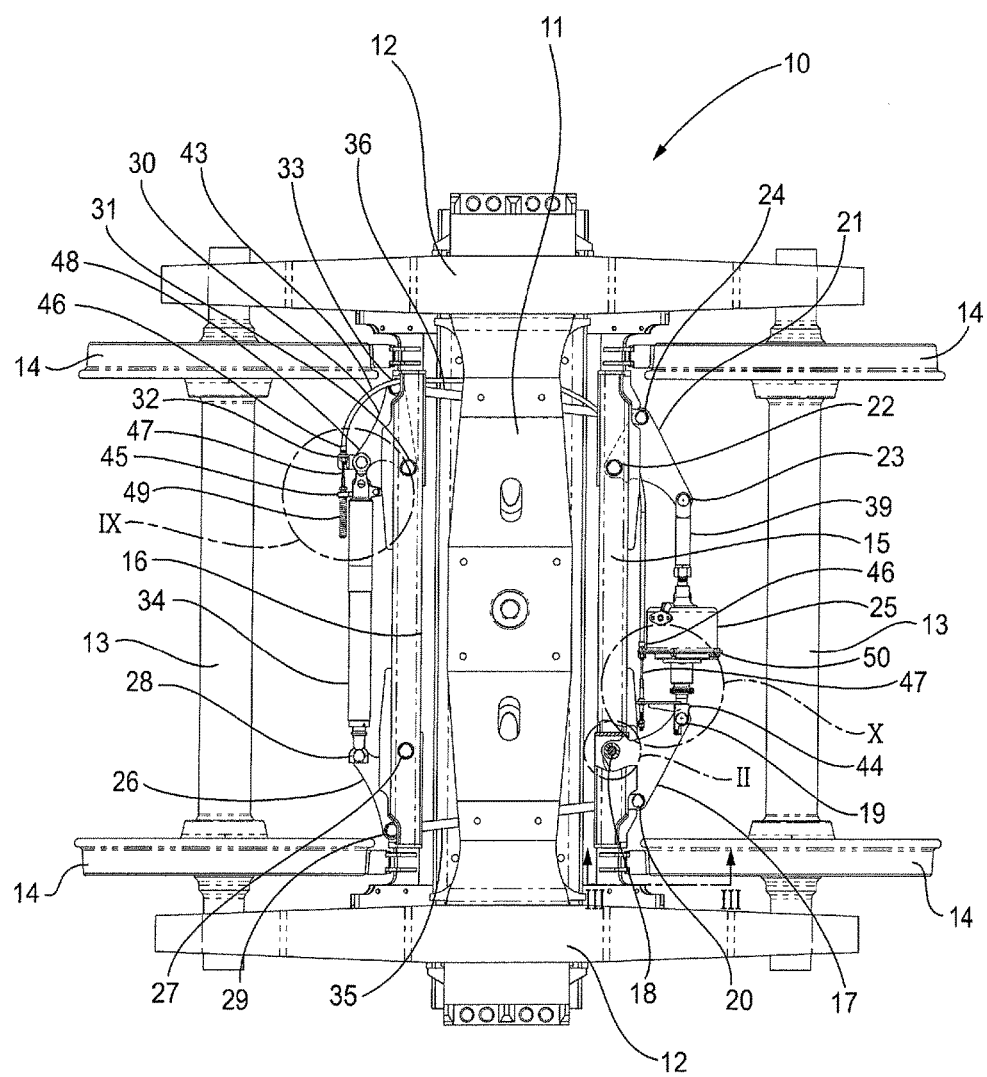
FIG. 1 is a top view of a railcar truck including a brake system in accordance with a non-limiting embodiment or aspect of the present disclosure.

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

With reference to FIG. 1, a railcar truck 10 including a brake system in accordance with a non-limiting embodiment or aspect of the present disclosure is shown. The railcar truck 10 includes a bolster 11 extending laterally between two side frames 12. The railcar truck 10 also includes forward and rearward axles 13 extending laterally between the side frames 12. Wheels 14 are mounted on each end of both the forward and rearward axles 13.

As shown in FIG. 1, the brake system includes a first brake beam 15 and a second brake beam 16 configured to be mounted on opposite sides of the bolster 11 of the truck 10. Each of the first brake beam 15 and the second brake beam 16 have a brake head 40 disposed on both ends thereof adjacent to the wheels 14, as shown in FIGS. 3-8B. The brake heads 40 support brake shoes 40A, shown in FIGS. 4A-8B, which are applied to the wheels 14 during actuation of the brake system to slow the railcar. The first brake beam 15 and the second brake beam 16 are identical in construction and mass.

Figure 10:
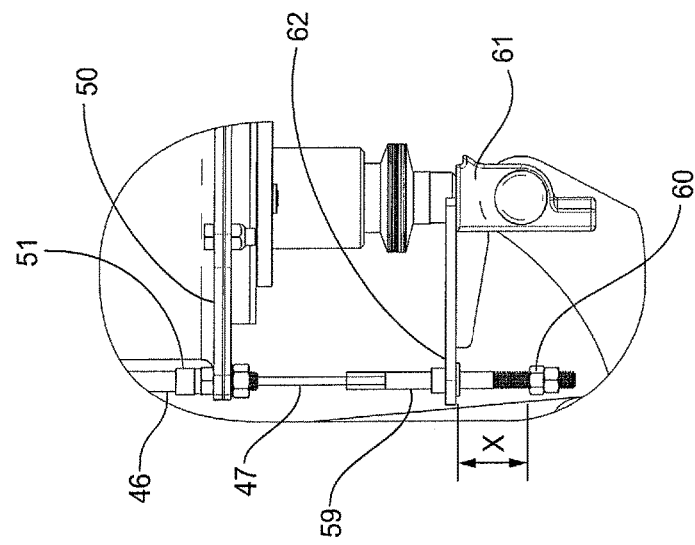
FIG. 10 is an enlarged view of a portion of the brake system shown in area X identified in FIG. 1.

A pneumatic brake cylinder 25 is connected to the first brake beam 15. As shown in FIGS. 1 and 10, the pneumatic brake cylinder 25 includes a cylinder clevis 39, a cylinder piston 44, a cylinder body 50 having a flange, a cylinder piston jaw 61 disposed on an end of the cylinder piston 44, and a piston travel arm 62 extending from the cylinder piston 44.

With reference to FIG. 1, a pair of levers 17, 21 is pivotally mounted to the first brake beam 15. Another pair of levers 26, 30 is pivotally mounted to the second brake beam 16. According to the non-limiting embodiment or aspect shown, the levers 17, 21, 26, 30 are bell crank levers, though it is to be appreciated that the levers 17, 21, 26, 30 may be of any type or configuration known to be suitable to those having ordinary skill in the art. The pairs of levers 17, 21, 26, 30 are each oriented in a horizontal plane. A first lever 17 and a second lever 21 of the first pair of levers are pivotally mounted to the first brake beam 15 at separate respective pivotal mounting points 18, 22 on the first brake beam 15. The first lever 17 and the second lever 21 are also connected to opposing ends of the pneumatic brake cylinder 25 to connect the brake cylinder 25 to the first brake beam 15. In particular, the end of the first lever arm 19 of the first lever 17 is connected to an end of the cylinder piston 44 and the end of the first lever arm 23 of the second lever 21 is connected to an end of the cylinder clevis 39 opposite to the end of the cylinder piston 44.

Figure 9:
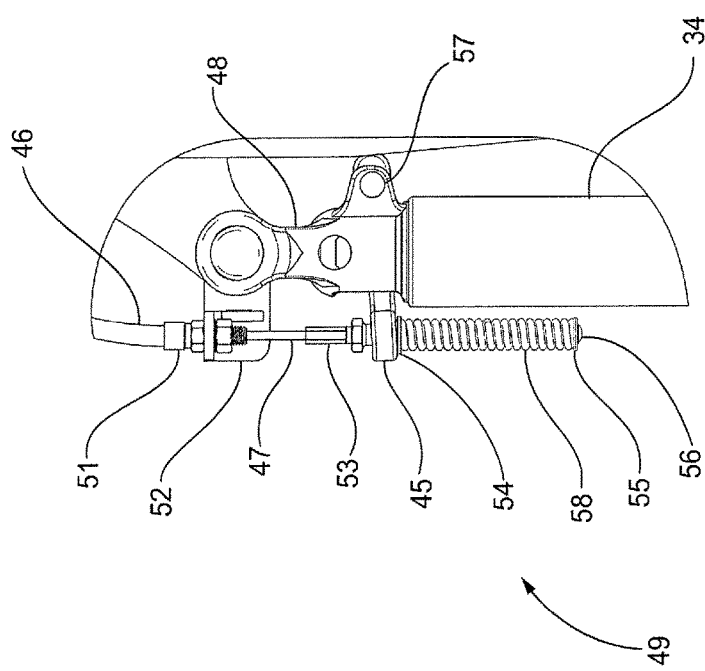
FIG. 9 is an enlarged view of a portion of the brake system shown in area IX identified in FIG. 1.

A slack adjuster 34 is connected to the second brake beam 16. As shown in FIGS. 1 and 9, the slack adjuster 34 includes a slack adjuster trigger 45 connected to the slack adjuster 34 at a trigger pivot 57, a slack adjuster jaw 48, and a cable bracket 52. A third lever 26 and a fourth lever 30 of the second pair of levers are pivotally mounted to the second brake beam 16 at separate respective pivotal mounting points 27, 31 on the second brake beam 16. The third lever 26 and the fourth lever 30 are also connected to opposing ends of the slack adjuster 34 to connect the slack adjuster 34 to the second brake beam 16. In particular, the end of a first lever arm 28 of the third lever 26 is connected to one end of the slack adjuster 34 and the end of a first lever arm 32 of the fourth lever is connected to an opposing end of the slack adjuster 34. The spacing between the pivot and connection arms in each of the pairs of levers 17, 21, 26, 30 may or may not be identical in distance.

A first push rod 35 operatively connects the first lever 17 to the second brake beam 16 and the slack adjuster 34. A second push rod 36 operatively connects the second lever 21 to the second brake beam 16 and the slack adjuster 34. Actuation of the brake cylinder 25 causes movement of the brake beams 15, 16 via the first and second levers 17, 21 and the first and second push rods 35, 36.

In particular, the first push rod 35 connects or operatively connects an end of a second lever arm 20 of the first lever 17 to an end of a second lever arm 29 of the third lever 26. The second push rod 36 connects or operatively connects an end of a second lever arm 24 of the second lever 21 to an end of a second lever arm 33 of the fourth lever 30. Accordingly, the second brake beam 16 and the slack adjuster 34 are operatively connected to the first push rod 35 and the second push rod 36 by the third lever 26 and the fourth lever 30, respectively.

Actuation of the brake cylinder 25 causes movement of the brake beams 15, 16 via the first, second, third and fourth levers 17, 21, 26, 30 and the first and second push rods 35, 36. In particular, extension of the cylinder piston 44 from the brake cylinder body 50 will cause the first pair of levers 17, 21 to pivot about the respective mounting points 18, 22 on the first brake beam 15 and against the first and second push rods 35, 36. The first and second push rods 35, 36, in turn, push against the second pair of levers 26, 30. Pivoting movement of the second pair of levers 26, 30 is limited by the slack adjuster 34. Accordingly, movement of the push rods 35, 36 will cause the first brake beam 15 and the second brake beam 16 to move in opposite directions until the brake shoes 40A disposed on the brake heads 40 on the ends of the brake beams 15, 16 come into contact with the wheels 14. It is to be appreciated that the first and second push rods 35, 36 may be connected to the second brake beam 16 and the slack adjuster 34 by some method or mechanism other than the second pair of levers 26, 30 in order to cause the opposing movements of the brake beams 15, 16 during actuation of the brake system.

It is to be appreciated that the position of the brake cylinder 25 and the slack adjuster 34 with respect to the bolster 11 may be reversed such that the brake cylinder 25 is connected to the second brake beam 16 and the slack adjuster 34 is connected to the first brake beam 15.

According to an alternative embodiment or aspect of the present disclosure, the second lever 21 may be fixedly, rather than pivotally, connected to the first brake beam 15 or may be replaced with a plate or bracket or similar structure that fixedly connects the cylinder clevis 39 to the first brake beam 15. According to this alternative, actuation of the brake cylinder 25 causes the above-described opposing movements of the brake beams 15, 16 by causing movement of the first lever 17, the second pair of levers 26, 30, and the first and second push rods 35, 36.

Figure 2:
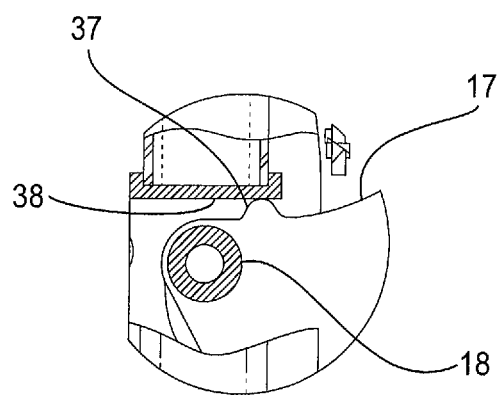
FIG. 2 is an enlarged view of a portion of the brake system shown in area II identified in FIG. 1.

With reference to FIGS. 1 and 2, each of the first pair of levers 17, 21 includes an integral protrusion 37 formed along an edge thereof. The protrusion 37 is located between the respective mounting point 18, 22 and the first lever arm 19, 23 of the lever 17, 21. Vertical wall portions 38 are provided at each end of the first brake beam 15 and extend from the first brake beam 15 adjacent to a respective one of the first pair of levers 17, 21. During initial set-up and installation of the system, the cylinder clevis 39 is adjusted until the protrusion 37 on each of the first pair of levers 17, 21 contacts or has minimal clearance with the respective vertical wall portion 38. The protrusions 37 and the respective wall portions 38 act as guides to ensure that the brake cylinder 25 and the first pair of levers 17, 21 return to a centered position with respect to the truck 10, thereby preventing the linkage of the brake system from becoming skewed in subsequent applications of the brake system. The vertical wall portions 38 are disposed on the first brake beam 15 symmetric about a centerline of the first brake beam 15 or the brake cylinder 25.

More particularly, the protrusions 37 and respective wall portions 38 act as stops for limiting movement of the levers 17, 21 as the brake cylinder 25 returns to a retracted state to correct any misalignment of the brake cylinder 25 and ensure that the force applied by the brake cylinder 25 to the brake heads 40 is distributed evenly. If the brake cylinder 25 becomes misaligned or skewed, the forces applied to the brake heads 40 by the brake cylinder 25 may become asymmetric. Further, the proper positioning and motion of the linkage of the levers, 17, 21, 26, 30 and the push rods 35, 36 necessary for operation of the system may be lost.

Figure 11:
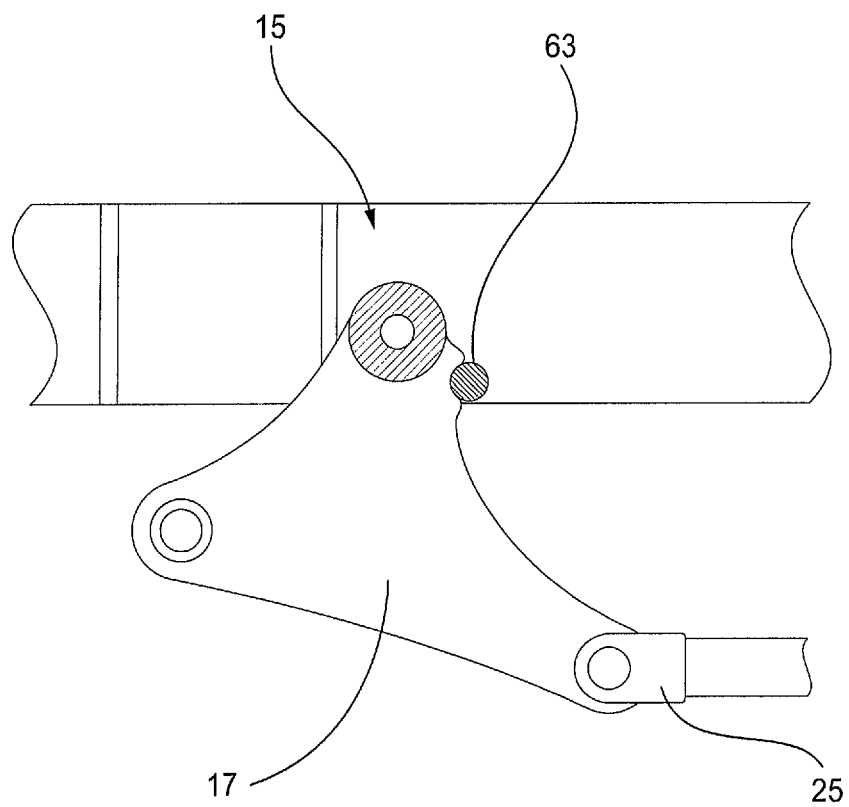
FIG. 11 is an enlarged view of the portion of the brake system shown in area II identified in FIG. 1 according to an alternative non-limiting embodiment or aspect of the present disclosure.

With reference to FIG. 11, an alternative stop or centering mechanism according to a non-limiting embodiment or aspect of the present disclosure is shown. The first brake beam 15 includes a cylindrical stop or pin 63 extending therefrom adjacent to each of the first pair of levers 17, 21. The cylindrical stop 63 engages with a notch or recess defined in the respective lever 17, 21 located between the respective mounting point 18, 22 and the first lever arm 19, 23 of the lever 17, 21, which allows for greater surface area contact between the cylindrical stops 63 and the first pair of lever arms 17, 21. During initial set-up and installation of the system, the cylinder clevis 39 is adjusted until the notch or recess on each of the first pair of levers 17, 21 contacts the respective cylindrical stop 63. The cylindrical stops 63 and the notches or recesses in the levers 17, 21 act as guides to ensure that the brake cylinder 25 and the first pair of levers 17, 21 return to a centered position with respect to the truck 10, thereby preventing the linkage of the brake system from becoming skewed or misaligned in subsequent applications of the brake system. The cylindrical stops 63 are disposed on the first brake beam 15 symmetric about a centerline of the first brake beam 15 or the brake cylinder 25.

Although not illustrated, it is to be appreciated that the second brake beam 16 may also be provided with wall portions 38 or pins 63 acting as stops for limiting movement of the third and fourth levers 26, 30, which may also include protrusions 37 that engage with respective wall portions 38 provided on the second brake beam 16 or notches or recesses that engage with respective pins 63.

It is to be appreciated that the stop and alignment mechanisms for the brake cylinder 25 described above with reference to FIGS. 2 and 11 may be re-configured or replaced with a different mechanism known to be suitable to those having ordinary skill in the art depending upon the specific construction or configuration of the truck 10 and the brake beams 15, 16.

Figure 3:
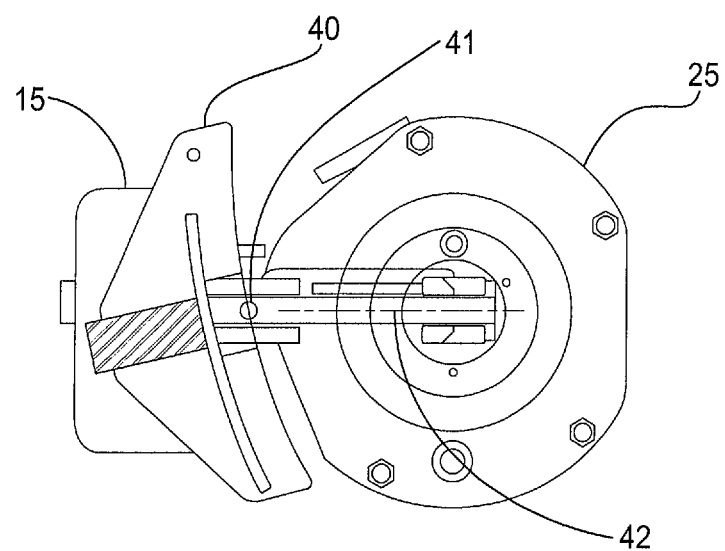
FIG. 3 is an enlarged cross-sectional view of the brake system taken along lines shown in FIG. 1.
Figure 4A:
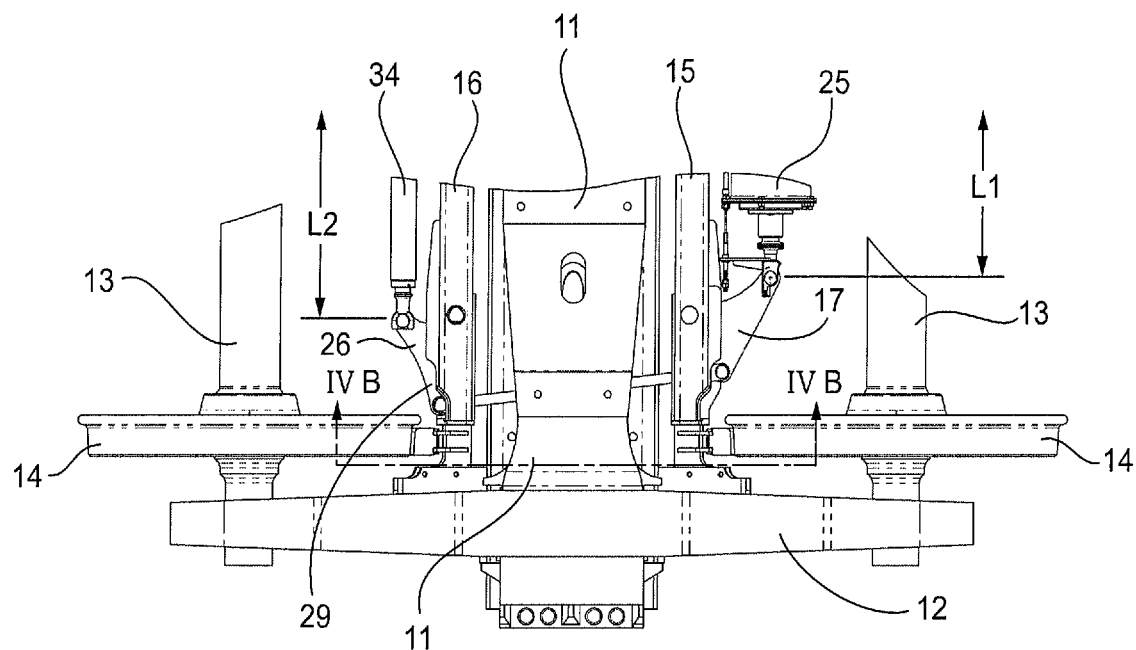
FIG. 4A is a top view of a portion of the railcar truck of FIG. 1 in a first state of use.
Figure 4B:
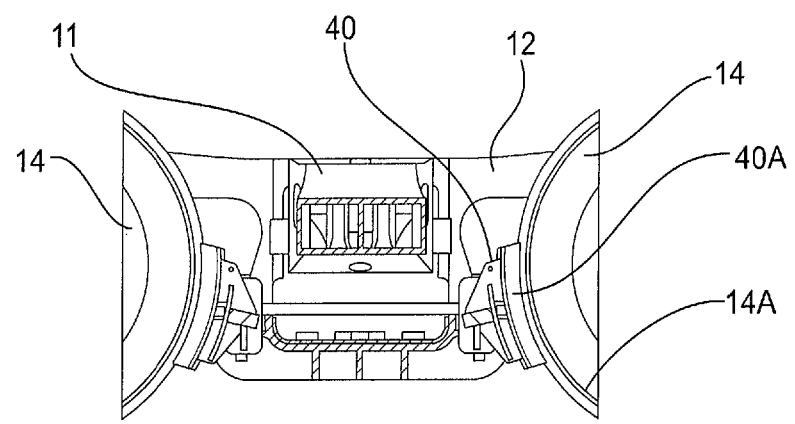
FIG. 4B is an end view taken along lines IVB-IVB shown in FIG. 4A.

With reference to FIGS. 1 and 3, as discussed above, the first and second brake beams 15, 16 each include brake heads 40 on each end thereof. Each of the brake heads 40 defines a center 41 of the brake face formed thereon. Also, the first pair of levers 17, 21 defined a mid-plane 42 extending through the levers 17, 21. As shown in FIG. 3, the mid-plane 42 of the levers 17, 21 is coincident or substantially coincident with the center 41 of the brake face. The second pair of levers 26, 30 may disposed within the same mid-plane 42.

With reference to FIGS. 1, 9, and 10, the brake system incorporates a slack adjustment mechanism that adjusts the linkage of the brake system to compensate for brake and wheel wear. In particular, the slack adjustment mechanism includes the brake cylinder 25, which includes the cylinder body 50 and the cylinder piston 44 extensible from the cylinder body 50, and the slack adjuster 34. The slack adjuster 34 has an adjustable length and includes the trigger arm 45 that, when actuated, will cause the slack adjuster 34 to adjust in length. The brake cylinder 25 and the slack adjuster 34 are disposed remotely from each other on the first brake beam 15 and the second brake beam 16, respectively.

As the brake shoes 40A and the wheels 14 wear, the cylinder piston 44 will need to extend further and further from the cylinder body 50 in order to move the brake beams 15, 16 sufficiently for the brake shoes 40A to come into engagement with the wheels 14 during an actuation of the brake system. As shown in FIGS. 4A-8B, in order to prevent over-extension of the cylinder piston 44, the slack adjuster 34 is configured to be triggered by movement of the trigger arm 45 to undergo a length adjustment as the brake shoes 40A and the wheels 14 wear over successive actuations of the brake system, which adjusts the positions of the second pair of levers 26, 30 and the push rods 35, 36 with respect to the brake beams 15, 16 such that the brake beams 15, 16 are moved further in opposing directions over successive actuations of the brake system.

In particular, the slack adjuster 34 is of a type well known to those having ordinary skill in the art, such as the slack adjusters described in U.S. Pat. Nos. 4,613,016 and 4,775,035, both of which are hereby incorporated by reference in their entireties. The slack adjuster 34 normally acts as a rigid link that allows for movement of the first and second push rods 35, 36 and the second pair of levers 26, 30 to be transmitted to the second brake beam 16. The slack adjuster 34 is triggered via movement of the trigger arm 45 to undergo a length adjustment, which may be either an increase or decrease in length in response to wear of the brake shoes 40A and the wheels 14. As will be described in further detail below, actuation of the cylinder piston 44 past a set travel distance X will cause movement of the trigger arm 45 and thereby trigger a length adjustment of the slack adjuster 34 in an amount corresponding to the amount of wear experienced by the brake shoes 40A and the wheels 14.

According to one example, the trigger arm 45 pivots with respect to the slack adjuster 34 to trigger the slack adjuster 34 by releasing an internal holding mechanism such as a pawl (not shown) and allows an internal torsion spring mechanism (not shown) to turn a nut (not shown) which lengthens or shortens the slack adjuster 34. The pawl and the torsion spring assembly of the slack adjuster 34 are double acting. One pawl is released from the nut to allow one torsion spring to turn the nut in one direction to cause elongation. The other pawl is released from the nut to allow another torsion spring to turn the nut in the other direction to cause contraction.

As shown in FIGS. 1, 9, and 10, the slack adjustment mechanism also includes a cable assembly 43 that operatively connects the brake cylinder 25 to the slack adjuster 34 in order to facilitate actuation of the slack adjuster 34 and acts as a remote trigger mechanism for activating or triggering the slack adjuster 34 to undergo a length adjustment. The cable assembly 43 includes an outer cable member 46, which is in the form of a conduit, having a first end rigidly connected by a threaded fitting 51 to a flange of the cylinder body 50 and a second end rigidly connected by a threaded fitting 51 to the cable bracket 52 extending from the slack adjuster jaw 48. The cable bracket 52 is permanently fixed to or is an integral part of the slack adjuster jaw 48.

The cable assembly 43 also includes an inner cable member 47 at least partially disposed in the outer cable member 46. The inner cable member 47 is slidably movable within the outer cable member 46. The inner cable member 47 has a first end connected to the cylinder piston 44 by way of the piston travel arm 62 extending from the cylinder piston 44 and a second end connected to the trigger arm 45 of the slack adjuster 34. The inner cable member 47 is connected to the cylinder piston 44 and the trigger arm 45 of the slack adjuster 34 such that the inner cable member 47 pulls the trigger arm 45 of the slack adjuster 34 and triggers the slack adjuster 34 to undergo a length adjustment when the brake cylinder 25 is actuated such that the cylinder piston 44 extends from the cylinder body 50 by a piston travel distance X.

With reference to FIGS. 9 and 10, the trigger arm 45 of the slack adjuster 34 is pivotally connected to the slack adjuster jaw 48 at the trigger pivot 57. Rotational movement of the trigger arm 45 moves internal components of the slack adjuster 34 until conditions are such that the slack adjuster 34 activates to compensate for wear of the brake shoes 40A and the wheels 14, as described above. The inner cable member 47 is free to move within the outer cable member 46. The threaded fittings 51 at the first and second ends of the outer cable member 46 are crimped to rigidly connect the ends of the outer cable member 46 to the cylinder body 50 and the cable bracket 52. The first end of the inner cable member 47 is defined by a cylinder cable rod end 59 and the second end of the inner cable member 47 is defined by a slack adjuster cable rod end 53. The cylinder cable rod end 59 and the slack adjuster cable rod end 53 are crimped to form rigid connections.

It is to be appreciated that the cable assembly 43 described above may be replaced with any other remote triggering mechanism found to be suitable to those having ordinary skill in the art. For instance, the cable assembly 43 may be replaced with a different tension member, such as a chain, or may incorporate a series of tension members of different construction. Alternatively, the cable assembly 43 may be connected between the trigger arm 45 of the slack adjuster 34 and a different component of the brake system, such as one of the levers 17, 21, 26, 30 or one of the push rods 35, 36. Or, the cable assembly 43 may be replaced with a mechanism of levers and rods connected between the slack adjuster 34 and the brake cylinder 25 or other suitable component within the brake system.

With reference to FIGS. 1, 9, and 10, the second end of the inner cable member 47 includes a spring over travel assembly 49 that is used to prevent damage due to excessive extension of the cylinder piston 44. The spring over travel assembly 49 connects the second end of the inner cable member 47 to the trigger arm 45 of the slack adjuster 34. The spring over travel assembly 49 includes the slack adjuster cable rod end 53, a spherical washer 54, a washer 55, a fastener 56, and a spring 58. The slack adjuster cable rod end 53 is inserted through an aperture in the trigger arm 45. On the opposite side of the trigger arm 45, the spherical washer 54 is assembled facing the aperture of the trigger arm 45 and resting against a shoulder on the slack adjuster cable rod end 53. Next, the spring 58 is assembled over the slack adjuster cable rod end 53 followed by the washer 55 and the fastener 56, which may be a screw. The washer 55 and fastener 56 are disposed at an end of the slack adjustment cable rod end 53 such that the spring 58 becomes disposed on the slack adjuster cable rod end 53 and held on the slack adjuster cable rod end 53 between the spherical washer 54 and the washer 55 and fastener 56. When the fastener 56 is tightened or secured, the spring 58 creates a pre-load sufficient to move the trigger arm 45 without further compression of the spring 58. The spring over travel assembly 49 prevents component damage should the trigger arm 45 contact the slack adjuster jaw 48 due to excessive extension of the cylinder piston 44. The joint interface at the aperture of the trigger arm 45 provides minor clearances to avoid binding. It is to be appreciated that the spring over travel assembly 49 is not necessary to operation of the slack adjuster 34. Rather, the spring 58 may be eliminated and the slack adjuster cable rod end 53 may rigidly engage the spherical washer 54.

The cylinder cable rod end 59 is inserted through a guiding section in the piston travel arm 62, which is permanently fixed, or is an integral part of the cylinder piston jaw 61. The cylinder cable rod end 59 is inserted through the piston travel arm 62 such that the piston travel arm 62 slidably connects the first end of the inner cable member 47 to the cylinder piston 44. Two hex nuts 60 are threaded on the cylinder cable rod end 59. After assembly of the brake system is completed, during set up of the system, the first of the two hex nuts 60 is moved to affect the proper piston travel adjustment distance X. The piston travel adjustment distance X is the extension distance of the cylinder piston 44 from the cylinder body 50 at which the cylinder piston 44 will pull on the inner cable member 47 to actuate the trigger arm 45 of the slack adjuster 34 and thereby trigger the slack adjuster 34. Once adjusted, the second of the two hex nuts 60 is moved against the first hex nut to lock the first hex nut in place and prevent unintended movement of the first hex nut.

During actuation of the brake cylinder 25 the cylinder piston 44 extends from the cylinder body 50 such that the piston travel arm 62 slidably moves along the cylinder cable rod end 59 until the cylinder piston 44 extends from the cylinder body 50 by the travel adjustment distance X, at which point the piston travel arm 62 will come into engagement with the hex nuts 60 thereby causing the cylinder cable rod end 59 and the inner cable member 47 to be pulled along with the cylinder piston 44. As the inner cable member 47 is pulled, it actuates the trigger arm 45 to trigger the slack adjuster 34. Accordingly, the hex nuts 60 act as adjustment elements that are moved along the cylinder cable rod end 59 to set the travel distance X of the cylinder piston that triggers the slack adjuster 34. It is to be appreciated that the hex nuts 60 may be replaced with a different adjustment element or elements known to be suitable to those having ordinary skill in the art. According to one embodiment of the present disclosure, the piston travel X is set to be 3", though it is to be appreciated that the piston travel X may be set to any length known to be suitable to those having ordinary skill in the art.

It is to be appreciated that piston travel X may be adjusted via a different mechanism known to be suitable to those having ordinary skill in the art. For instance, the adjustment element 60 may be disposed on the slack adjuster 34 rather than the piston 44 of the brake cylinder 34 or the adjustment element 60 may be disposed in another position along the cable assembly 43.

Figure 12:
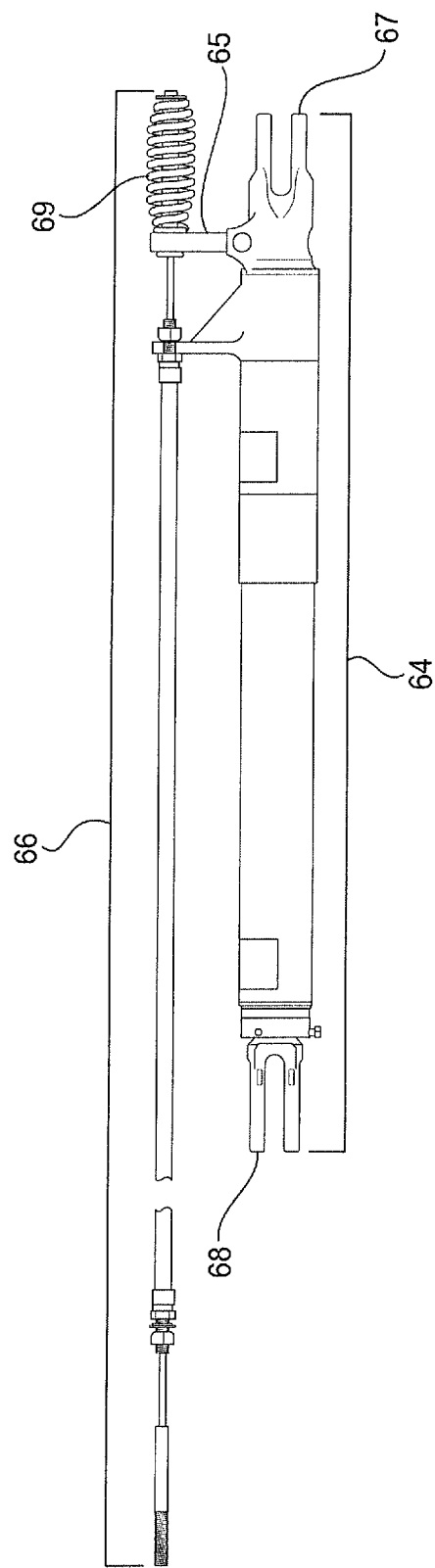
FIG. 12 is an enlarged view of a slack adjuster for the brake system according to an alternative non-limiting embodiment or aspect of the present disclosure.

With reference to FIG. 12, a configuration of a slack adjuster 64 and cable assembly 66 in accordance with an alternative embodiment or aspect of the present disclosure is shown. The configuration illustrated in FIG. 12 differs from the configuration of the slack adjuster 34 and cable assembly 43 described above with reference to FIGS. 1 and 9 in that the cable assembly 66 pulls the trigger arm 65 of the slack adjuster 64 in the direction toward the clevis 68 or lever attachment of the slack adjuster 64 furthest from the trigger arm 65 rather than toward the nearer clevis 67 or lever attachment. Similar to the slack adjuster 34 described above with reference to FIGS. 1 and 9, the slack adjuster 64 is triggered to undergo a length adjustment when the trigger arm 65 is pulled by the cable assembly 66 toward the furthest clevis 68. The trigger arm 65 may be reversible. The nearer clevis 67 has an extended body with a bracket for mounting the cable assembly 66. A spring over travel assembly 69 provides over travel relief when the brake cylinder 25 is actuated to prevent damage to the slack adjuster 64. According to this non-limiting embodiment or aspect, the cable assembly 66 can be provided with a smooth bend radius when connected between the brake cylinder 25 and the slack adjuster 64, which will prolong the life of the cable assembly 66.

With reference to FIGS. 1-8B, the set up and operation of the brake system through the life cycle of the brake shoes 40A and the wheels 14 will now be described in detail. As shown in FIGS. 1,2, 4A, and 4B, during installation of new wheels 14 and brake shoes 40A on the truck 10, the pneumatic brake cylinder 25 is positioned in a retracted state "L1". The slack adjuster 34 is positioned in a fully closed state "L2". The cylinder clevis 39 is adjusted until the protrusion 37 on each of the first pair of levers 17, 21 contacts or has minimal clearance with the respective vertical wall 38 at the respective end of the first brake beam 15. This feature ensures that the brake cylinder 25 and the first pair of levers 17, 21 return to a centered position after actuation, preventing the linkage of the brake system from becoming skewed during subsequent actuations of the brake system. As shown in FIG. 2, the space between the faces 14A of the wheels 14 and the respective break heads 40 is sufficient to allow for installation of the brake shoes 40A on the brake heads 40.

Figure 5A:
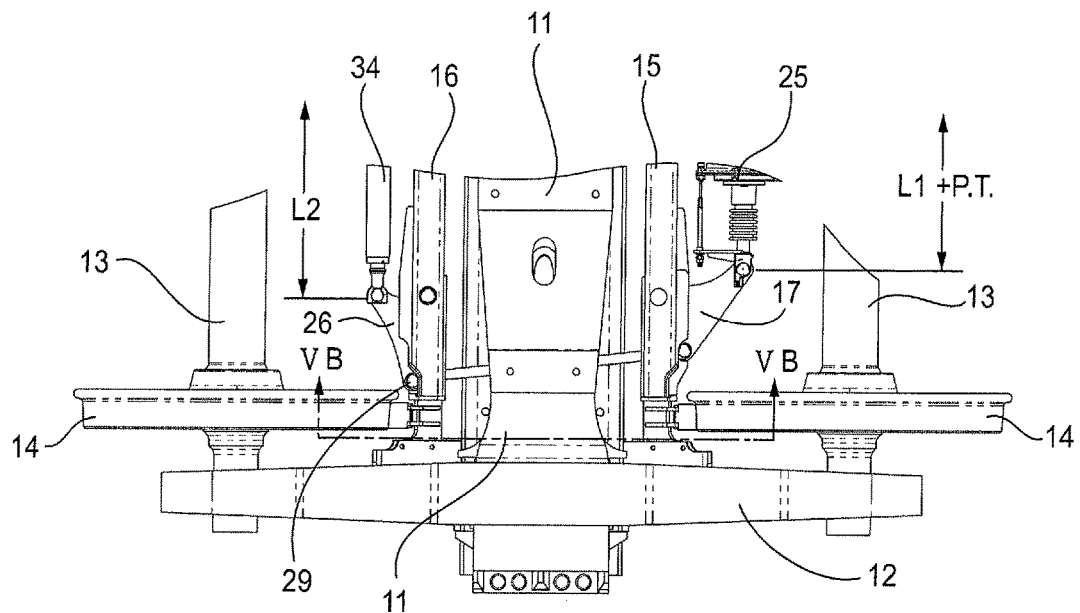
FIG. 5A is a top view of a portion of the railcar truck of FIG. 1 in a second state of use.
Figure 5B:
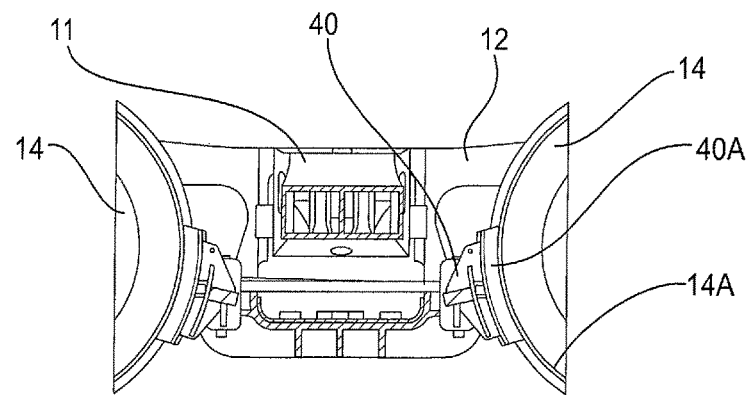
FIG. 5B is an end view taken along lines VB-VB shown in FIG. 5A.

With FIGS. 5A and 5B, during set up of the brake system when new wheels 14 and shoes 40A are installed, the brake system is actuated to apply the brake shoes 40A to the respective wheels 14 by applying air to the brake cylinder 25, causing the cylinder piston 44 to move to an extended position "L1"+P.T. The first or inner nut of the two hex nuts 60 is adjusted until the proper piston travel X is achieved. In subsequent actuations of the brake system, the piston travel X remains the same. The slack adjuster 34 is activated by the cable assembly 43 during the piston travel adjustment sequence, increasing in length, to move the brake shoes 40A into contact with the faces 14A of the wheels 14, while allowing the brake cylinder 25 and the first pair of levers 17, 21 to provide the proper brake forces.

Figure 6A:
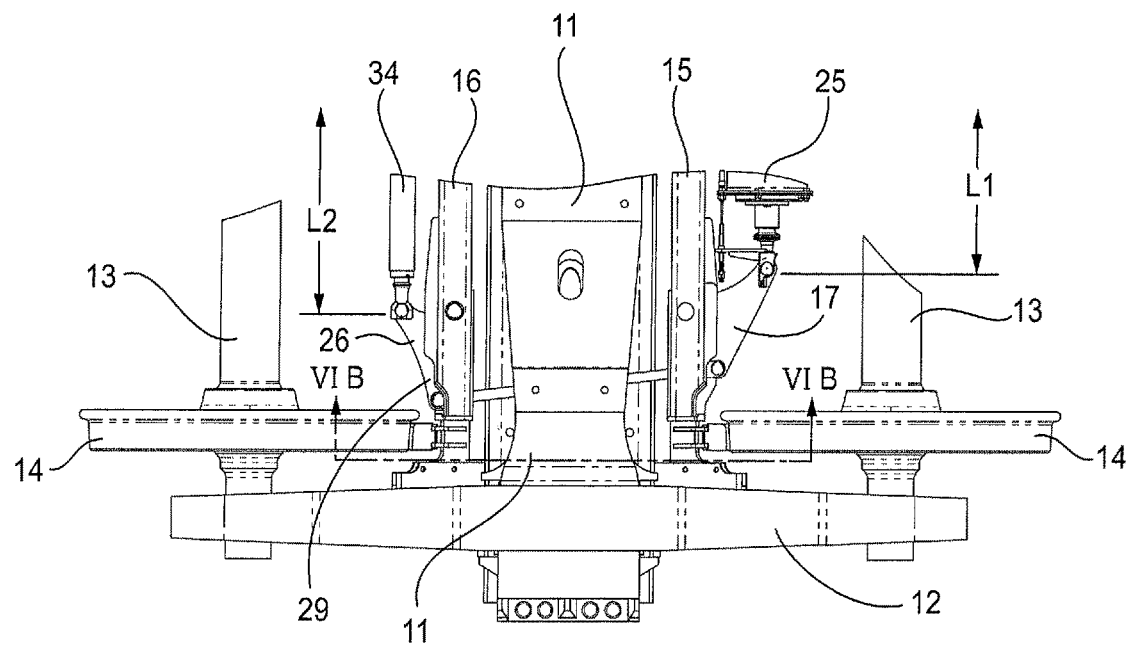
FIG. 6A is a top view of a portion of the railcar truck of FIG. 1 in a third state of use.
Figure 6B:
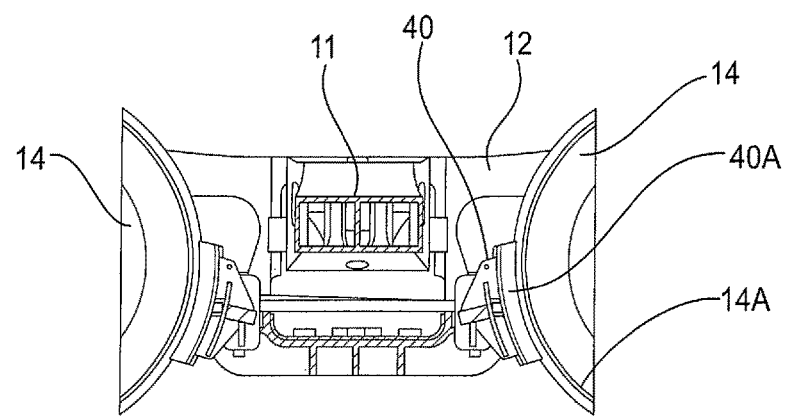
FIG. 6B is an end view taken along lines VIB-VIB shown in FIG. 6A.

With reference to FIGS. 6A and 6B, when the brake system is released, the brake cylinder 25 returns to the retracted state "L1". The slack adjuster 34 maintains the length "L2" achieved in the previous activation of the slack adjuster 34 during an actuation of the brake system. The slack adjuster 34 will be activated to increase in length during subsequent actuations of the brake system to accommodate wear between the brakes shoes 40A and the faces 14A of the wheels 14. The retraction of the brake cylinder 25 allows the brake beams 15, 16 to move toward each other and away from the faces 14A of the respective wheels 14, thereby creating a clearance between the brake shoes 40A and the respective faces 14A of the wheels 14.

Figure 7A:
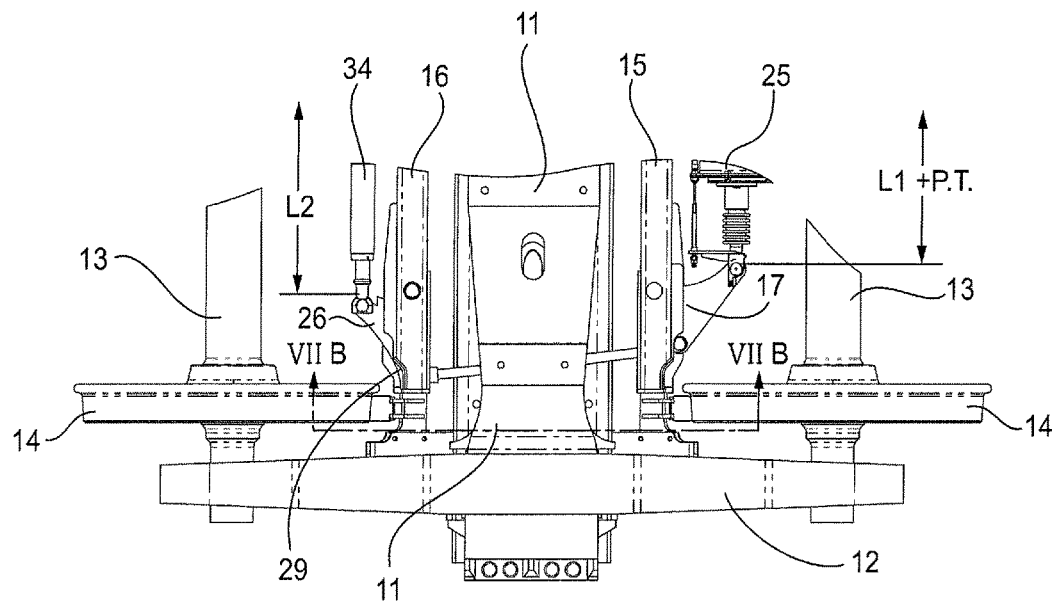
FIG. 7A is a top view of a portion of the railcar truck of FIG. 1 in a fourth state of use.
Figure 7B:
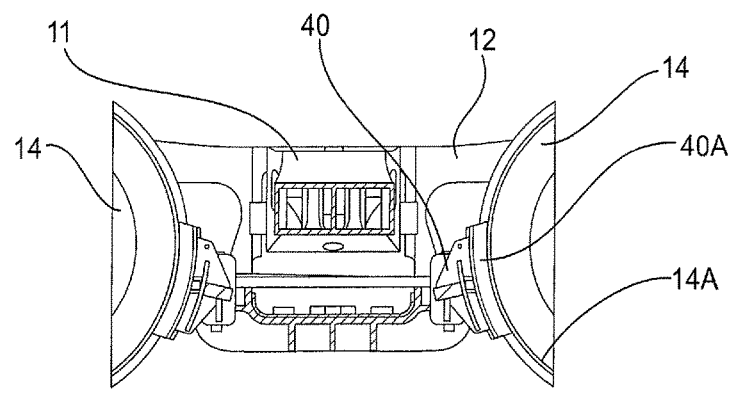
FIG. 7B is an end view taken along lines VIIB-VIIB shown in FIG. 7A.

As shown in FIGS. 7A and 7B, when the brake shoes 40A have been replaced and are in a new condition, but the wheels 14 are in a half worn condition, the length "L2" of the slack adjuster 34 has increased due to wear of the previous brake shoes 40A and the wheels 14. The second pair of levers 26, 30 have rotated in correspondence to the length adjustment the slack adjuster 34, moving the respective second arms 29, 33 of the second pair of levers 26, 30 toward the longitudinal center line of the truck 10.

Figure 8A:
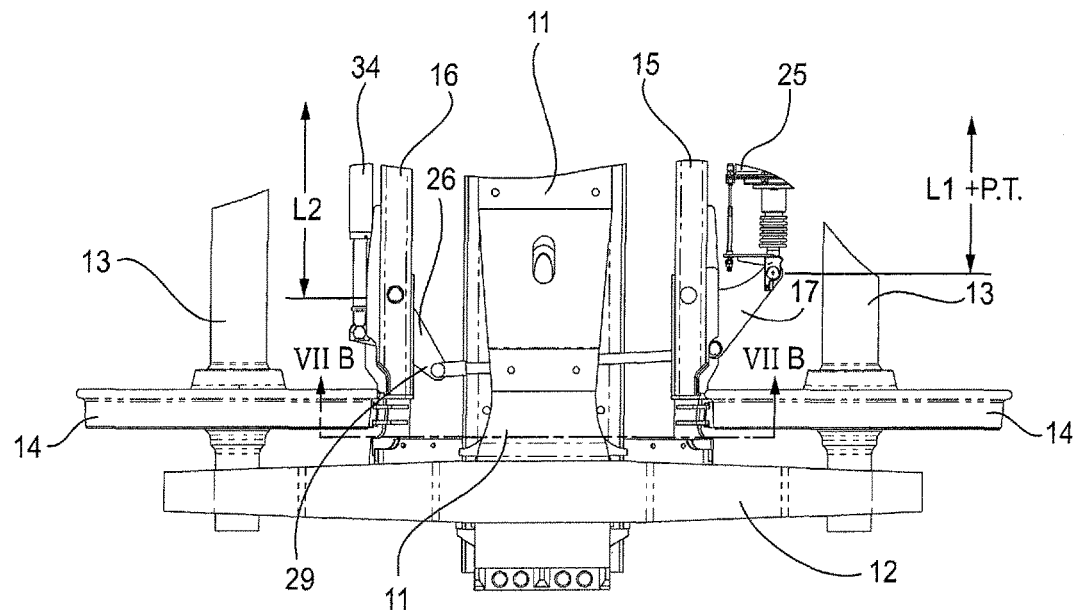
FIG. 8A is a top view of a portion of the railcar truck of FIG. 1 in a fifth state of use.
Figure 8B:
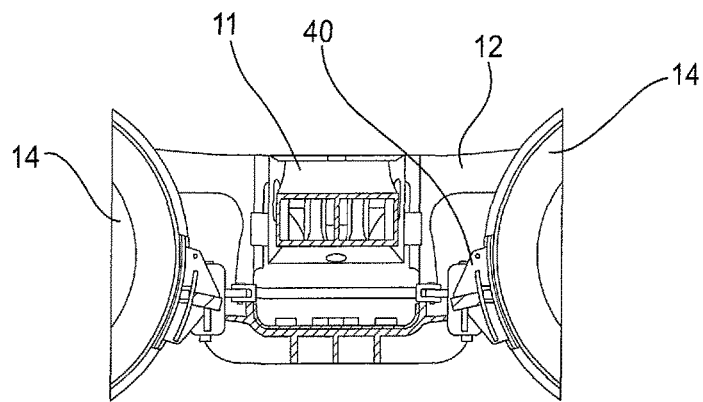
FIG. 8B is an end view taken along lines VIIIB-VIIIB shown in FIG. 8A.

As shown in FIGS. 8A and 8B, when both the brake shoes 40A and the faces 14A of the wheels 14 are in a worn condition, the length "L2" of the slack adjuster 34 has increased further due to wear of the brake shoes 40A and the faces 14A of the wheels 14, and is close to the operational limits for the slack adjuster 34. The rotation of the second pair of levers 26, 30 has increased further toward the longitudinal center line of the truck 10. New wheels 14, brake shoes 40A, and compression/resetting of the slack adjuster 34 are now required as all components have reached their operating limits.

With reference to FIGS. 1-10, a method of installing a railcar brake system on a railcar truck 10 is provided in accordance with a non-limiting embodiment or aspect of the present disclosure. The method includes providing a railcar brake system as described above with respect to FIGS. 1-10. The method further includes the following steps: mounting the first brake beam 15 and the second brake beam 16 on opposite sides of the bolster 11 of the railcar truck 10; pivotally connecting the first lever 17 and the second lever 21 at separate points 18, 22 on the first brake beam 15; connecting the first lever 17 and the second lever 21 to opposing ends of the brake cylinder 25 to connect the brake cylinder 25 to the first brake beam 15; operatively connecting the first lever 17 to the second brake beam 16 via the first push rod 35; and operatively connecting the second lever 21 to the second brake beam 16 via the second push rod 36. Actuation of the brake cylinder 25 causes movement of the brake beams 15, 16 via the first and second levers 17, 21 and the first and second push rods 35, 36. The first brake beam 15 includes at the at least two wall portions 38 extending from the first brake beam 15 adjacent to the each of the first lever 17 and the second lever 21, respectively. The method further includes the step of adjusting the brake cylinder 25 until the protrusions 37 on the first lever 17 and the second lever 21 contact or have minimal clearance with the respective wall portions 38 extending from the first brake beam 15 to center the brake cylinder 25 and the first and second levers 17, 21 with respect to the railcar truck 10.

The method may further include the steps of: pivotally connecting the third lever 26 and the fourth lever 30 to the second brake beam 16 at separate points 27, 31 on the second brake beam 16; and connecting the third lever 26 and the fourth lever 30 to opposing ends of the slack adjuster 34 to connect the slack adjuster 34 to the second brake beam 16. The first push rod 35 operatively connects the third lever 26 to the first lever 17 and the second push rod 36 operatively connects the fourth lever 30 to the second lever 21. Actuation of the brake cylinder 25 causes movement of the brake beams 15, 16 via the first, second, third, and fourth levers 17, 21, 26, 30 and the first and second push rods 35, 36. The second brake beam 16 and the slack adjuster 34 are operatively connected to the first push rod 35 and the second push rod 36 by the third lever 26 and the fourth lever 30, respectively.

It is to be understood that the invention may assume various alternative variations and step sequences, except where expressly specified to the contrary. It is also to be understood that the specific devices and processes illustrated in the attached drawings, and described in the specification, are simply exemplary embodiments or aspects of the invention. Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope thereof. For example, it is to be understood that the present invention contemplates that, to the extent possible, one or more features of any embodiment or aspect can be combined with one or more features of any other embodiment or aspect.

The invention claimed is:

1. A railcar brake system, comprising:
   a first brake beam and a second brake beam configured to be mounted on opposite sides of a bolster of a railcar truck, each of the first brake beam and the second brake beam being configured to have brake heads disposed on opposing ends thereof;
   a brake cylinder connected to the first brake beam;
   a first lever and a second lever pivotally connected to the first brake beam at separate points on the first brake beam, the first lever and the second lever also being connected to opposing ends of the brake cylinder to connect the brake cylinder to the first brake beam;
   a slack adjuster connected to the second brake beam, the slack adjuster being connected to the second brake beam remotely from the first brake beam and the brake cylinder;
   a third lever and a fourth lever pivotally connected to the second brake beam at separate points on the second brake beam, the third lever and the fourth lever also being connected to opposing ends of the slack adjuster to connect the slack adjuster to the second brake beam;
   a first push rod operatively connecting the first lever to the second brake beam and the slack adjuster, the first push rod also operatively connecting the third lever to the first lever; and
   a second push rod operatively connecting the second lever to the second brake beam and the slack adjuster, the second push rod also operatively connecting the fourth lever to the second lever,
   wherein the first lever is pivotally connected to the first brake beam, an end of the brake cylinder, and an end of the first push rod, and wherein an opposing end of the first push rod is operatively connected to the second brake beam and the slack adjuster, and
   wherein the second lever is pivotally connected to the first brake beam, an opposing end of the brake cylinder, and an end of the second push rod, and wherein an opposing end of the second push rod is operatively connected to the second brake beam and the slack adjuster,
   wherein the first push rod and the second push rod are configured to extend under the bolster of the railcar truck, and
   wherein actuation of the brake cylinder causes movement of the brake beams via the first, second, third, and fourth levers and the first and second push rods.

2. The railcar brake system according claim 1, wherein the second brake and the slack adjuster are operatively connected to the first push rod and the second push rod by the third lever and the fourth lever, respectively.

3. The railcar brake system according to claim 1, wherein the first brake beam includes at least two stops disposed thereon adjacent to each of the first lever and the second lever, and
   wherein the at least two stops are configured to engage the first lever and the second lever to limit movement of the first lever and the second lever and to align the brake cylinder and the first and second levers with respect to the truck.

4. The railcar brake system according to claim 1, further comprising brake heads disposed on each end of the first brake beam and the second brake beam, each of the brake heads defining a brake face having a center,
   wherein the first lever and the second lever define a common mid-plane extending through the levers, and
   wherein the mid-plane of the levers is substantially coincident with the center of each of the brake faces of the brake heads.

5. The railcar brake system according to claim 1, wherein the slack adjuster has an adjustable length, and
   wherein the slack adjuster comprises a trigger arm configured to be actuated to trigger the slack adjuster to undergo a length adjustment.

6. The railcar brake system according to claim 5, further comprising a remote trigger mechanism connected to the trigger arm, wherein the remote trigger mechanism is configured to actuate the trigger arm when the brake cylinder is actuated.

7. The railcar brake system according to claim 6, wherein the remote trigger mechanism comprises a cable assembly operatively connecting the brake cylinder to the slack adjuster, the cable assembly comprising:
   an outer conduit having a first end connected to the brake cylinder and a second end connected to the slack adjuster; and
   an inner cable at least partially disposed in the outer conduit, the inner cable having a first end connected to the brake cylinder and a second end connected to the trigger arm of the slack adjuster,
   wherein the inner cable is connected to the brake cylinder and the trigger arm of the slack adjuster such that the inner cable pulls the trigger arm of the slack adjuster and triggers the slack adjuster when the brake cylinder is actuated.

8. The railcar brake system according to claim 7, wherein the trigger arm is pivotally connected to a slack adjuster jaw of the slack adjuster, and
   wherein the system further comprises a spring over travel assembly connecting the second end of the inner cable of the cable assembly to the trigger arm of the slack adjuster, the spring over travel assembly comprising:
   a slack adjuster cable rod end defining the second end of the inner cable, the slack adjuster cable rod end extending through an aperture defined in the trigger arm;
   a spherical washer disposed on the slack adjuster cable rod end in a position facing the aperture of the trigger arm;

a washer and a fastener disposed at an end of the slack adjuster cable rod end; and a spring disposed on the slack adjuster cable rod end, the spring being held on the slack adjuster cable rod end between the spherical washer and the washer and fastener, wherein the spring over travel assembly is configured to prevent damage to the trigger arm caused by the trigger arm contacting the slack adjuster jaw.

9. The railcar brake system according to claim 7, wherein the brake cylinder comprises a cylinder body and a cylinder piston, wherein the first end of the outer conduit of the cable assembly is connected to the cylinder body and the first end of the inner cable of the cable assembly is connected to the cylinder piston, wherein the brake cylinder is actuated such that the cylinder piston extends from the cylinder body, and wherein the cylinder piston causes the inner cable to pull the trigger arm of the slack adjuster to trigger the slack adjuster when the cylinder piston extends from the brake cylinder by a travel distance.

10. The railcar brake system according to claim 9, wherein the first end of the inner cable of the cable assembly is defined by a cylinder cable rod end, wherein the cylinder cable rod end is inserted through a piston travel arm extending from a cylinder piston jaw of the cylinder piston to slidably connect the first end of the inner cable to the cylinder piston, wherein at least one adjustment element is disposed on the cylinder cable rod end, and wherein the at least one adjustment element is configured to be moved along the cylinder cable rod end to set the travel distance of the cylinder piston.

11. A slack adjustment mechanism for a railcar brake system, comprising:

a brake cylinder, the brake cylinder comprising a cylinder body and a cylinder piston;

a slack adjuster positioned remotely from the brake cylinder in the brake assembly, the slack adjuster having an adjustable length and comprising a trigger arm configured to be actuated to trigger the slack adjuster to undergo a length adjustment; and a remote trigger mechanism connected to the trigger arm, wherein the remote trigger mechanism is configured to actuate the trigger arm when the brake cylinder is actuated, wherein the remote trigger mechanism comprises a cable assembly operatively connecting the brake cylinder to the slack adjuster, the cable assembly comprising a cable member having a first end connected to the cylinder piston and a second end connected to the trigger arm of the slack adjuster, wherein the cable member is connected to the cylinder piston and the trigger arm of the slack adjuster such that the cable member pulls the trigger arm of the slack adjuster and triggers the slack adjuster when the brake cylinder is actuated such that the cylinder piston extends from the cylinder body by a travel distance, wherein the trigger arm is pivotally connected to a slack adjuster jaw of the slack adjuster, wherein the mechanism further comprises a spring over travel assembly connecting the second end of the cable member to the trigger arm of the slack adjuster, the spring over travel assembly comprising:

a slack adjuster cable rod end defining the second end of the cable member, the slack adjuster cable rod end extending through an aperture defined in the trigger arm; and a spring disposed on the slack adjuster cable rod end, the spring being held between an end of the slack adjuster cable rod end and the trigger arm, wherein the spring over travel assembly is configured to prevent damage to the trigger arm caused by the trigger arm contacting the slack adjuster jaw.

12. The slack adjustment mechanism according to claim 11, wherein the cable assembly further comprises an outer conduit having a first end connected to the cylinder body and a second end connected to the slack adjuster, and wherein the cable member is at least partially disposed in the outer conduit.

13. The slack adjustment mechanism according to claim 12, wherein the spring over travel assembly further comprises:

a spherical washer disposed on the slack adjuster cable rod end in a position facing the aperture of the trigger arm; and a washer and a fastener disposed at an end of the slack adjuster cable rod end, wherein the spring is held on the slack adjuster cable rod end between the spherical washer and the washer and fastener.

14. The slack adjustment mechanism according to claim 12, further comprising at least one adjustment element disposed on the cable assembly, the at least one adjustment element being configured to be moved along the cable assembly to set the travel distance of the cylinder piston.

15. A railcar brake system, comprising:

a first brake beam and a second brake beam configured to be mounted on opposite sides of a bolster of a railcar truck;

a brake cylinder connected to the first brake beam;

at least one lever pivotally connected to the first brake beam, the at least one lever also being pivotally connected to an end of the brake cylinder to connect the brake cylinder to the first brake beam;

a slack adjuster operatively connected to the brake cylinder, the slack adjuster being connected to the second brake beam remotely from the first brake beam and the brake cylinder;

a pair of levers pivotally connected to the second brake beam at separate points on the second brake beam;

a first push rod operatively connecting the at least one lever pivotally connected to the first brake beam to one of the pair of levers, the at least one lever pivotally connected to the first brake beam also being pivotally connected to an end of the first push rod, the opposing end of the first push rod being pivotally connected to one of the pair of levers;

a second push rod operatively connecting the first brake beam to the other of the pair of levers, the second push rod having an end pivotally connected to the other of the pair of levers and an opposing end operatively connected to the first brake beam; and brake heads disposed on each end of the first brake beam and the second brake beam, each of the brake heads defining a brake face having a center, wherein the first push rod and the second push rod are configured to extend under the bolster of the railcar truck, wherein actuation of the brake cylinder causes movement of the brake beams via the at least one lever pivotally connected to the first brake beam, the pair of levers pivotally connected to the second brake beam, and the first and second push rods, and wherein the at least one lever pivotally connected to the first brake beam and the pair of levers pivotally connected to the second brake beam define a common mid-plane extending through all of the levers, and wherein the mid-plane of the levers is substantially coincident with the center of each of the brake faces of the brake heads.

16. The railcar brake system according to claim 15, wherein the at least one lever pivotally connected to the first brake beam comprises a first lever and a second lever pivotally connected to the first brake beam at separate points on the first brake beam, the first lever and the second lever also being connected to opposing ends of the brake cylinder to connect the brake cylinder to the first brake beam.

17. A railcar brake system, comprising:
a first brake beam and a second brake beam configured to be mounted on opposite sides of a bolster of a railcar truck, each of the first brake beam and the second brake beam being configured to have brake heads disposed on opposing ends thereof;
a brake cylinder connected to the first brake beam;
at least one lever pivotally connected to the first brake beam, the at least one lever also being connected to an end of the brake cylinder to connect the brake cylinder to the first brake beam;
a slack adjuster connected to the second brake beam, the slack adjuster being oriented parallel to the second brake beam, the slack adjuster being connected to the second brake beam remotely from the first brake beam and the brake cylinder;
a pair of levers pivotally connected to the second brake beam at separate points on the second brake beam, the pair of levers also being connected to opposing ends of the slack adjuster to connect the slack adjuster to the second brake beam;
a first push rod pivotally connected to the first lever and to one of the pair of levers; and
a second push rod connected to the first brake beam and pivotally connected to the other of the pair of levers,
wherein the first push rod and the second push rod are configured to extend under the bolster of the railcar truck, and
wherein actuation of the brake cylinder causes movement of the brake beams via the at least one lever pivotally connected to the first brake beam, the pair of levers pivotally connected to the second brake beam, and the first and second push rods.

18. The railcar brake system according to claim 17, wherein and the first brake beam includes at least one stop disposed thereon adjacent to the lever pivotally connected to the first brake beam, and
wherein the at least one stop is configured to engage the lever to limit movement of the lever and to align the brake cylinder and the lever with respect to the truck.

19. The railcar brake system according to claim 17, wherein the slack adjuster has an adjustable length, and
wherein the slack adjuster comprises a trigger arm configured to be actuated to trigger the slack adjuster to undergo a length adjustment.

20. The railcar brake system according to claim 19, further comprising a remote trigger mechanism connected to the trigger arm, wherein the remote trigger mechanism is configured to actuate the trigger arm when the brake cylinder is actuated.

* * * * *

UNITED STATES PATENT AND TRADEMARK OFFICE
CERTIFICATE OF CORRECTION

PATENT NO. : 10,232,865 B2
APPLICATION NO. : 15/221834
DATED : March 19, 2019
INVENTOR(S) : Richard Wayne Plegge et al.

Page 1 of 1

It is certified that error appears in the above-identified patent and that said Letters Patent is hereby corrected as shown below:

In the Claims

Column 22, Line 7, Claim 2, delete "according" and insert -- according to --

Column 22, Line 8, Claim 2, delete "brake" and insert -- brake beam --

Signed and Sealed this
Fourth Day of June, 2019

Andrei Iancu
*Director of the United States Patent and Trademark Office*